(12) United States Patent
Starr et al.

(10) Patent No.: US 11,014,543 B2
(45) Date of Patent: May 25, 2021

(54) VEHICLE BRAKE SYSTEM HAVING PLUNGER POWER SOURCE

(71) Applicant: Kelsey-Hayes Company, Livonia, MI (US)

(72) Inventors: Joseph Starr, Plymouth, MI (US); Blaise Ganzel, Ann Arbor, MI (US)

(73) Assignee: ZF Active Safety US Inc., Livonia, MI (US)

( * ) Notice: Subject to any disclaimer, the term of this patent is extended or adjusted under 35 U.S.C. 154(b) by 0 days.

(21) Appl. No.: 16/237,209

(22) Filed: Dec. 31, 2018

(65) Prior Publication Data

US 2019/0275995 A1    Sep. 12, 2019

Related U.S. Application Data

(63) Continuation-in-part of application No. PCT/US2017/044547, filed on Jul. 28, 2017, which is
(Continued)

(51) Int. Cl.
*B60T 8/40* (2006.01)
*B60T 8/44* (2006.01)
(Continued)

(52) U.S. Cl.
CPC .......... *B60T 8/4018* (2013.01); *B60T 8/368* (2013.01); *B60T 8/441* (2013.01); *F16D 65/14* (2013.01);
(Continued)

(58) Field of Classification Search
CPC ........ B60T 8/4018; B60T 8/368; B60T 8/441; B60T 8/4081; F16D 65/14; F16D 65/16;
(Continued)

(56) References Cited

U.S. PATENT DOCUMENTS

| 4,427,346 A | 1/1984 | Romer |
| 4,653,815 A * | 3/1987 | Agarwal .................. B60T 8/00 303/115.2 |

(Continued)

FOREIGN PATENT DOCUMENTS

| EP | 0565153 A1 | 10/1993 |
| JP | 2011105075 A | 6/2011 |

OTHER PUBLICATIONS

International Search Report, Application No. PCT/US2017/044547, dated Nov. 8, 2017.

*Primary Examiner* — Bradley T King
*Assistant Examiner* — James K Hsiao
(74) *Attorney, Agent, or Firm* — Robert James Harwood

(57) ABSTRACT

The invention relates to an improved plunger assembly for a vehicle brake system. The plunger assembly is operable as a pressure source to control brake fluid pressure supplied to one or more wheel brakes. The plunger assembly comprises a housing defining a cylinder; a reversible motor supported by the housing and having a rotor; and a linear actuator such as a ball screw/nut mechanism driven by the motor. A plunger head is mounted in the cylinder and driven by the linear actuator in first and second opposite directions. Improvements include the plunger assembly engage at least one seal that defines a portion of a pressurized chamber. An end cap covers the projecting end of the cylinder and is secured to the housing to define a fluid passageway between the end of the cylinder and at least one fluid passageway provided in the housing block.

5 Claims, 23 Drawing Sheets

Related U.S. Application Data a continuation of application No. 15/221,648, filed on Jul. 28, 2016, now Pat. No. 10,272,891.

(60) Provisional application No. 62/611,939, filed on Dec. 29, 2017.

(51) Int. Cl.
  *F16D 65/14* (2006.01)
  *F16D 65/16* (2006.01)
  *B60T 8/36* (2006.01)
  *F16D 125/36* (2012.01)
  *F16D 125/40* (2012.01)
  *F16D 121/20* (2012.01)

(52) U.S. Cl.
  CPC ............ *F16D 65/16* (2013.01); *B60T 8/4081* (2013.01); *F16D 2121/20* (2013.01); *F16D 2125/36* (2013.01); *F16D 2125/40* (2013.01)

(58) Field of Classification Search
  CPC ............ F16D 2121/20; F16D 2125/36; F16D 2125/40
  See application file for complete search history.

(56) References Cited

U.S. PATENT DOCUMENTS

| | | | | |
|---|---|---|---|---|
| 4,938,543 A | * | 7/1990 | Parker | B60T 8/4266 180/197 |
| 5,058,445 A | | 10/1991 | Nilsson | |
| 5,147,118 A | * | 9/1992 | Reuter | B60T 8/4266 188/162 |
| 5,201,851 A | | 4/1993 | Holmstrom | |
| 5,253,981 A | * | 10/1993 | Yang | F04B 9/047 210/101 |
| 5,328,257 A | * | 7/1994 | Tsukamoto | B60T 8/363 303/115.2 |
| 5,438,888 A | | 8/1995 | Dickhoff | |
| 5,439,278 A | * | 8/1995 | Tsukamoto | B60T 8/4266 188/162 |
| 5,454,631 A | * | 10/1995 | Frieling | B60T 8/489 303/113.2 |
| 5,667,283 A | | 9/1997 | Drennen et al. | |
| 6,024,422 A | * | 2/2000 | Drennen | B60T 8/00 303/115.2 |
| 6,073,505 A | | 6/2000 | Yuda | |
| 6,079,797 A | * | 6/2000 | Ganzel | B60T 8/4018 303/116.1 |
| 6,311,576 B1 | | 11/2001 | Pietschet | |
| 6,416,138 B1 | * | 7/2002 | Barnett | B60T 7/20 188/156 |
| 6,490,942 B1 | | 12/2002 | Meyer | |
| 7,562,594 B2 | | 7/2009 | Nagai et al. | |
| 8,443,685 B2 | | 5/2013 | Wu | |
| 8,656,798 B2 | | 2/2014 | Kawahara et al. | |
| 8,893,627 B2 | | 11/2014 | Hwu et al. | |
| 9,321,444 B2 | * | 4/2016 | Ganzel | B60T 13/168 |
| 9,631,685 B2 | * | 4/2017 | Sakai | B60T 13/662 |
| 2012/0248862 A1 | | 10/2012 | Ohnishi et al. | |
| 2014/0026557 A1 | * | 1/2014 | Ohnishi | B60T 13/745 60/545 |
| 2015/0115701 A1 | | 4/2015 | Koo | |

* cited by examiner

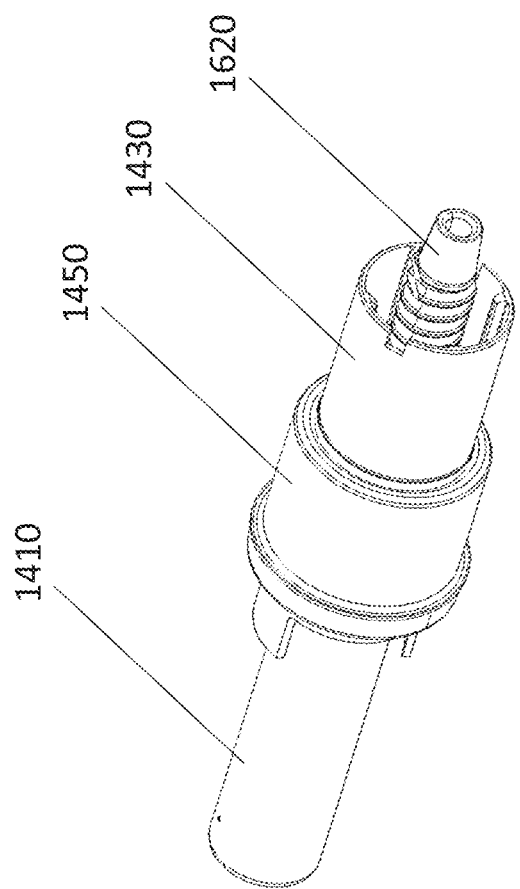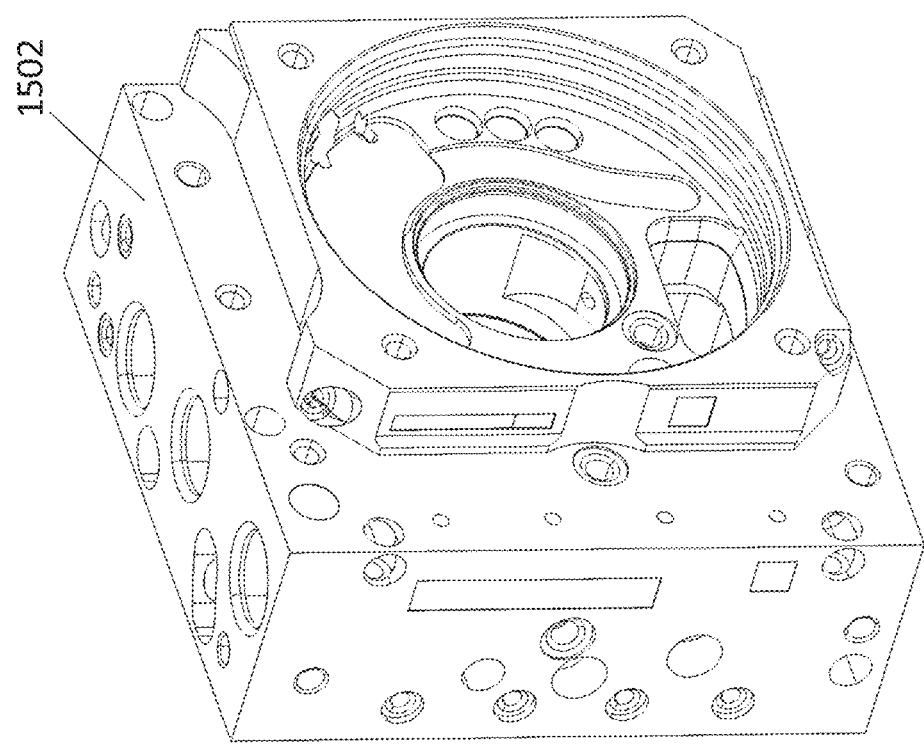
Fig. 16

VEHICLE BRAKE SYSTEM HAVING PLUNGER POWER SOURCE

CROSS REFERENCE TO RELATED APPLICATION

This application is a continuation in part of International Application PCT/US17/44547 filed Jul. 28, 2017 which designated the U.S. and that International Application was published in English under PCT Article 21(2) on Feb. 1, 2018 as International Publication Number WO 2018/023091, the full disclosure of which is incorporated herein by reference. PCT/US17/44547 claims priority to U.S. patent application Ser. No. 15/221,648, filed Jul. 28, 2016, the full disclosure of which is incorporated herein by reference. Thus, the subject non provisional application claims priority to U.S. patent application Ser. No. 15/221,648, filed Jul. 28, 2016. This application claims priority to, and the benefit of, U.S. Provisional Application Ser. No. 62/611,939, filed Dec. 29, 2017, the full disclosure of which is incorporated herein by reference.

BACKGROUND OF THE INVENTION

This invention relates in general to vehicle braking systems. Vehicles are commonly slowed and stopped with hydraulic brake systems. These systems vary in complexity but a base brake system typically includes a brake pedal, a tandem master cylinder, fluid conduits arranged in two similar but separate brake circuits, and wheel brakes in each circuit. The driver of the vehicle operates a brake pedal which is connected to the master cylinder. When the brake pedal is depressed, the master cylinder generates hydraulic forces in both brake circuits by pressurizing brake fluid. The pressurized fluid travels through the fluid conduit in both circuits to actuate brake cylinders at the wheels to slow the vehicle.

Base brake systems typically use a brake booster which provides a force to the master cylinder which assists the pedal force created by the driver. The booster can be vacuum or hydraulically operated. A typical hydraulic booster senses the movement of the brake pedal and generates pressurized fluid which is introduced into the master cylinder. The fluid from the booster assists the pedal force acting on the pistons of the master cylinder which generate pressurized fluid in the conduit in fluid communication with the wheel brakes. Thus, the pressures generated by the master cylinder are increased. Hydraulic boosters are commonly located adjacent the master cylinder piston and use a boost valve to control the pressurized fluid applied to the booster.

Braking a vehicle in a controlled manner under adverse conditions requires precise application of the brakes by the driver. Under these conditions, a driver can easily apply excessive braking pressure thus causing one or more wheels to lock, resulting in excessive slippage between the wheel and road surface. Such wheel lock-up conditions can lead to greater stopping distances and possible loss of directional control.

Advances in braking technology have led to the introduction of Anti-lock Braking Systems (ABS). An ABS system monitors wheel rotational behavior and selectively applies and relieves brake pressure in the corresponding wheel brakes in order to maintain the wheel speed within a selected slip range to achieve maximum braking force. While such systems are typically adapted to control the braking of each braked wheel of the vehicle, some systems have been developed for controlling the braking of only a portion of the plurality of braked wheels.

Electronically controlled ABS valves, comprising apply valves and dump valves, are located between the master cylinder and the wheel brakes. The ABS valves regulate the pressure between the master cylinder and the wheel brakes. Typically, when activated, these ABS valves operate in three pressure control modes: pressure apply, pressure dump and pressure hold. The apply valves allow pressurized brake fluid into respective ones of the wheel brakes to increase pressure during the apply mode, and the dump valves relieve brake fluid from their associated wheel brakes during the dump mode. Wheel brake pressure is held constant during the hold mode by closing both the apply valves and the dump valves.

To achieve maximum braking forces while maintaining vehicle stability, it is desirable to achieve optimum slip levels at the wheels of both the front and rear axles. During vehicle deceleration different braking forces are required at the front and rear axles to reach the desired slip levels. Therefore, the brake pressures should be proportioned between the front and rear brakes to achieve the highest braking forces at each axle. ABS systems with such ability, known as Dynamic Rear Proportioning (DRP) systems, use the ABS valves to separately control the braking pressures on the front and rear wheels to dynamically achieve optimum braking performance at the front and rear axles under the then current conditions.

A further development in braking technology has led to the introduction of Traction Control (TC) systems. Typically, valves have been added to existing ABS systems to provide a brake system which controls wheel speed during acceleration. Excessive wheel speed during vehicle acceleration leads to wheel slippage and a loss of traction. An electronic control system senses this condition and automatically applies braking pressure to the wheel cylinders of the slipping wheel to reduce the slippage and increase the traction available. In order to achieve optimal vehicle acceleration, pressurized brake fluid is made available to the wheel cylinders even if the master cylinder is not actuated by the driver.

During vehicle motion such as cornering, dynamic forces are generated which can reduce vehicle stability. A Vehicle Stability Control (VSC) brake system improves the stability of the vehicle by counteracting these forces through selective brake actuation. These forces and other vehicle parameters are detected by sensors which signal an electronic control unit. The electronic control unit automatically operates pressure control devices to regulate the amount of hydraulic pressure applied to specific individual wheel brakes. In order to achieve optimal vehicle stability, braking pressures greater than the master cylinder pressure must quickly be available at all times.

Brake systems may also be used for regenerative braking to recapture energy. An electromagnetic force of an electric motor/generator is used in regenerative braking for providing a portion of the braking torque to the vehicle to meet the braking needs of the vehicle. A control module in the brake system communicates with a powertrain control module to provide coordinated braking during regenerative braking as well as braking for wheel lock and skid conditions. For example, as the operator of the vehicle begins to brake during regenerative braking, electromagnet energy of the motor/generator will be used to apply braking torque (i.e., electromagnetic resistance for providing torque to the powertrain) to the vehicle. If it is determined that there is no longer a sufficient amount of storage means to store energy recovered from the regenerative braking or if the regenerative braking cannot meet the demands of the operator, hydraulic braking will be activated to complete all or part of the braking action demanded by the operator. Preferably, the hydraulic braking operates in a regenerative brake blending manner so that the blending is effectively and unnoticeably picked up where the electromagnetic braking left off. It is desired that the vehicle movement should have a smooth transitional change to the hydraulic braking such that the changeover goes unnoticed by the driver of the vehicle.

SUMMARY OF THE INVENTION

The invention concerns an improved plunger assembly for a vehicle brake system. The plunger assembly is operable as a pressure source to control brake fluid pressure supplied to one or more wheel brakes. The plunger assembly comprises a housing defining a cylinder having a first port; a reversible motor supported by the housing and having a rotor; and a linear actuator driven by the motor. Preferably, the linear actuator includes a ball screw mechanism having a screw and a nut, with one of the screw and the nut defining a rotatable component connected to the motor rotor, and the other one of the screw and the nut defining a translatable component. The plunger assembly also includes an anti-rotation member coupled to the translatable component to allow translation and resist rotation of the translatable component within the housing. A plunger head is mounted in the cylinder and driven by the translatable component in first and second opposite directions. The plunger head cooperates with the cylinder to define a first chamber containing brake fluid received from a fluid reservoir, and the first chamber is hydraulically connected to the wheel brakes via the first port. In at least one operating mode, fluid pressure in the first chamber is increased when the plunger head is moved in the first direction and is decreased when the plunger head is moved in the second direction.

According to a further aspect of the invention, the cylinder projects from one side of a housing block, and an end cap covers the projecting end of the cylinder and is secured to the housing block in a generally coaxial relationship with the cylinder. The cylinder and the end cap cooperate to define a fluid passageway between the end of the cylinder and at least one fluid passageway provided in the housing block.

Various aspects of this invention will become apparent to those skilled in the art from the following detailed description of the preferred embodiment, when read in light of the accompanying drawings.

BRIEF DESCRIPTION OF THE DRAWINGS

FIG. 16 is a partially exploded, perspective view of the ball screw and support structure assembly of FIG. 15 and the plunger housing.

DETAILED DESCRIPTION OF THE PREFERRED EMBODIMENT

Figure 1:
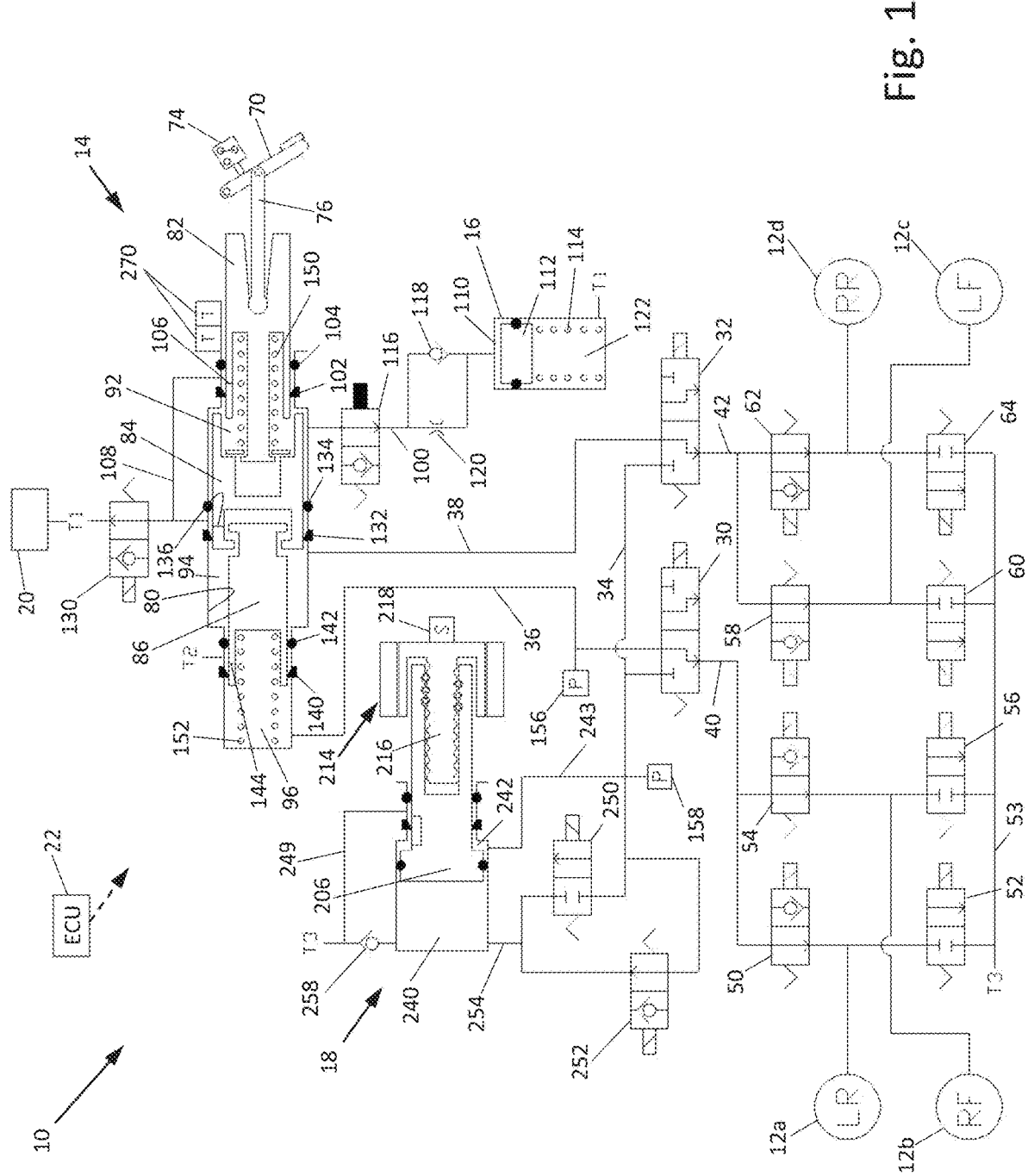
FIG. 1 is a schematic illustration of a first embodiment of a brake system.

Referring now to the drawings, there is schematically illustrated in FIG. 1 a first embodiment of a vehicle brake system, indicated generally at 10. The brake system 10 is a hydraulic braking system in which fluid pressure from a source is operated to apply braking forces for the brake system 10. The brake system 10 may suitably be used on a ground vehicle such as an automotive vehicle having four wheels. Furthermore, the brake system 10 can be provided with other braking functions such as anti-lock braking (ABS) and other slip control features to effectively brake the vehicle, as will be discussed below. In the illustrated embodiment of the brake system 10, there are four wheel brakes 12a, 12b, 12c, and 12d. The wheel brakes 12a, 12b, 12c, and 12d can have any suitable wheel brake structure operated by the application of pressurized brake fluid. The wheel brakes 12a, 12b, 12c, and 12d may include, for example, a brake caliper mounted on the vehicle to engage a frictional element (such as a brake disc) that rotates with a vehicle wheel to effect braking of the associated vehicle wheel. The wheel brakes 12a, 12b, 12c, and 12d can be associated with any combination of front and rear wheels of the vehicle in which the brake system 10 is installed. A diagonally split brake system is illustrated such that the wheel brake 12a is associated with the left rear wheel, the wheel brake 12*b* is associated with the right front wheel, the wheel brake 12*c* is associated with the left front wheel, and the wheel brake 12*d* is associated with the right rear wheel. Alternatively for a vertically split system, the wheel brakes 12*a* and 12*b* may be associated with the front wheels, and the wheel brakes 12*c* and 12*d* may be associated with the rear wheels.

The brake system 10 includes a brake pedal unit, indicated generally at 14, a pedal simulator 16, a plunger assembly, indicated generally at 18, and a reservoir 20. The reservoir 20 stores and holds hydraulic fluid for the brake system 10. The fluid within the reservoir 20 is preferably held at or about atmospheric pressure but may store the fluid at other pressures if so desired. The brake system 10 may include a fluid level sensor (not shown) for detecting the fluid level of the reservoir 20. Note that in the schematic illustration of FIG. 1, conduit lines may not be specifically drawn leading to the reservoir 20 but may be represented by conduits ending and labelled with T1, T2, or T3 indicating that these various conduits are connected to one or more tanks or sections of the reservoir 20. Alternatively, the reservoir 20 may include multiple separate housings. As will be discussed in detail below, the plunger assembly 18 of the brake system 10 functions as a source of pressure to provide a desired pressure level to the wheel brakes 12*a*, 12*b*, 12*c*, and 12*d* during a typical or normal brake apply. Fluid from the wheel brakes 12*a*, 12*b*, 12*c*, and 12*d* may be returned to the plunger assembly 18 and/or diverted to the reservoir 20.

The brake system 10 includes an electronic control unit (ECU) 22. The ECU 22 may include microprocessors. The ECU 22 receives various signals, processes signals, and controls the operation of various electrical components of the brake system 10 in response to the received signals. The ECU 22 can be connected to various sensors such as pressure sensors, travel sensors, switches, wheel speed sensors, and steering angle sensors. The ECU 22 may also be connected to an external module (not shown) for receiving information related to yaw rate, lateral acceleration, longitudinal acceleration of the vehicle such as for controlling the brake system 10 during vehicle stability operation. Additionally, the ECU 22 may be connected to the instrument cluster for collecting and supplying information related to warning indicators such as an ABS warning light, a brake fluid level warning light, and a traction control/vehicle stability control indicator light.

The brake system 10 further includes first and second isolation valves 30 and 32. The isolation valves 30 and 32 may be solenoid actuated three way valves. The isolation valves 30 and 32 are generally operable to two positions, as schematically shown in FIG. 1. The first and second isolation valves 30 and 32 each have a port in selective fluid communication with an output conduit 34 generally in communication with an output of the plunger assembly 18, as will be discussed below. The first and second isolation valves 30 and 32 also includes ports that are selectively in fluid communication with conduits 36 and 38, respectively, when the first and second isolation valves 30 and 32 are non-energized, as shown in FIG. 1. The first and second isolation valves 30 and 32 further include ports that are in fluid communication with conduits 40 and 42, respectively, which provide fluid to and from the wheel brakes 12*a*, 12*b*, 12*c*, and 12*d*.

The system 10 further includes various solenoid actuated valves (slip control valve arrangement) for permitting controlled braking operations, such as ABS, traction control, vehicle stability control, and regenerative braking blending. A first set of valves includes a first apply valve 50 and a first dump valve 52 in fluid communication with the conduit 40 for cooperatively supplying fluid received from the first isolation valve 30 to the wheel brake 12*a*, and for cooperatively relieving pressurized fluid from the wheel brake 12*a* to a reservoir conduit 53 in fluid communication with the reservoir 20. A second set of valves includes a second apply valve 54 and a second dump valve 56 in fluid communication with the conduit 40 for cooperatively supplying fluid received from the first isolation valve 30 to the wheel brake 12*b*, and for cooperatively relieving pressurized fluid from the wheel brake 12*b* to the reservoir conduit 53. A third set of valves includes a third apply valve 58 and a third dump valve 60 in fluid communication with the conduit 42 for cooperatively supplying fluid received from the second isolation valve 32 to the wheel brake 12*c*, and for cooperatively relieving pressurized fluid from the wheel brake 12*c* to the reservoir conduit 53. A fourth set of valves includes a fourth apply valve 62 and a fourth dump valve 64 in fluid communication with the conduit 42 for cooperatively supplying fluid received from the second isolation valve 32 to the wheel brake 12*d*, and for cooperatively relieving pressurized fluid from the wheel brake 12*d* to the reservoir conduit 53. Note that in a normal braking event, fluid flows through the non-energized open apply valves 50, 54, 58, and 62. Additionally, the dump valves 52, 56, 60, and 64 are preferably in their non-energized closed positions to prevent the flow of fluid to the reservoir 20.

The brake pedal unit 14 is connected to a brake pedal 70 and is actuated by the driver of the vehicle as the driver presses on the brake pedal 70. A brake sensor or switch 72 may be connected to the ECU 22 to provide a signal indicating a depression of the brake pedal 70. As will be discussed below, the brake pedal unit 14 may be used as a back-up source of pressurized fluid to essentially replace the normally supplied source of pressurized fluid from the plunger assembly 18 under certain failed conditions of the brake system 10. The brake pedal unit 14 can supply pressurized fluid in the conduits 36 and 38 (that are normally closed off at the first and second isolation valves 30 and 32 during a normal brake apply) to the wheel brake 12*a*, 12*b*, 12*c*, and 12*d* as required.

The brake pedal unit 14 includes a housing having a multi-stepped bore 80 formed therein for slidably receiving various cylindrical pistons and other components therein. The housing may be formed as a single unit or include two or more separately formed portions coupled together. An input piston 82, a primary piston 84, and a secondary piston 86 are slidably disposed within the bore 80. The input piston 82 is connected with the brake pedal 70 via a linkage arm 76. Leftward movement of the input piston 82, the primary piston 84, and the secondary piston 86 may cause, under certain conditions, a pressure increase within an input chamber 92, a primary chamber 94, and a secondary chamber 96, respectively. Various seals of the brake pedal unit 14 as well as the structure of the housing and the pistons 82, 84, and 86 define the chambers 92, 94, and 96. For example, the input chamber 92 is generally defined between the input piston 82 and the primary piston 84. The primary chamber 94 is generally defined between the primary piston 84 and the secondary piston 86. The secondary chamber 96 is generally defined between the secondary piston 86 and an end wall of the housing formed by the bore 80.

The input chamber 92 is in fluid communication with the pedal simulator 16 via a conduit 100, the reason for which will be explained below. The input piston 92 is slidably disposed in the bore 80 of the housing of the brake pedal unit 14. An outer wall of the input piston 82 is engaged with a lip seal 102 and a seal 104 mounted in grooves formed in the housing. A passageway 106 (or multiple passageways) is formed through a wall of the piston 82. As shown in FIG. 1, when the brake pedal unit 14 is in its rest position (the driver is not depressing the brake pedal 70), the passageway 106 is located between the lip seal 102 and the seal 104. In the rest position, the passageway 106 permits fluid communication between the input chamber 92 and the reservoir 20 via a conduit 108. Sufficient leftward movement of the input piston 82, as viewing FIG. 1, will cause the passageway 106 to move past the lip seal 102, thereby preventing the flow of fluid from the input chamber 92 into the conduit 108 and the reservoir 20. Further leftward movement of the input piston 82 will pressurize the input chamber 92 causing fluid to flow into the pedal simulator 16 via the conduit 100. As fluid is diverted into the pedal simulator 16, a simulation chamber 110 within the pedal simulator 16 will expand causing movement of a piston 112 within the pedal simulator 16. Movement of the piston 112 compresses a spring assembly, schematically represented as a spring 114. The compression of the spring 114 provides a feedback force to the driver of the vehicle which simulates the forces a driver feels at the brake pedal 70 in a conventional vacuum assist hydraulic brake system, for example. The spring 114 of the pedal simulator 16 can include any number and types of spring members as desired. For example, the spring 114 may include a combination of low rate and high rate spring elements to provide a non-linear force feedback. The simulation chamber 110 is in fluid communication with the conduit 100 which is in fluid communication with the input chamber 92. A solenoid actuated simulator valve 116 is positioned within the conduit 100 to selectively prevent the flow of fluid from the input chamber 92 to the simulation chamber, such as during a failed condition in which the brake pedal unit 14 is utilized to provide a source of pressurized fluid to the wheel brakes. A check valve 118 in parallel with a restricted orifice 120 may be positioned with the conduit 100. The spring 114 of the pedal simulator 16 may be housed within a non-pressurized chamber 122 in fluid communication with the reservoir 20 (T1).

As discussed above, the input chamber 92 of the brake pedal unit 14 is selectively in fluid communication with the reservoir 20 via a conduit 108 and the passageway 106 formed in the input piston 82. The brake system 10 may include an optional simulator test valve 130 located within the conduit 108. The simulator test valve 130 may be electronically controlled between an open position, as shown in FIG. 1, and a powered closed position. The simulator test valve 130 is not necessarily needed during a normal boosted brake apply or for a manual push through mode. The simulator test valve 130 can be energized to a closed position during various testing modes to determine the correct operation of other components of the brake system 10. For example, the simulator test valve 130 may be energized to a closed position to prevent venting to the reservoir 20 via the conduit 108 such that a pressure build up in the brake pedal unit 14 can be used to monitor fluid flow to determine whether leaks may be occurring through seals of various components of the brake system 10.

The primary chamber 94 of the brake pedal unit 14 is in fluid communication with the second isolation valve 32 via the conduit 38. The primary piston 84 is slidably disposed in the bore 80 of the housing of the brake pedal unit 14. An outer wall of the primary piston 84 is engaged with a lip seal 132 and a seal 134 mounted in grooves formed in the housing. One or more passageways 136 are formed through a wall of the primary piston 84. The passageway 136 is located between the lip seal 132 and the seal 134 when the primary piston 84 is in its rest position, as shown in FIG. 1. Note that in the rest position the lip seal 132 is just slightly to the left of the passageway 136, thereby permitting fluid communication between the primary chamber 94 and the reservoir 20.

The secondary chamber 96 of the brake pedal unit 14 is in fluid communication with the first isolation valve 30 via the conduit 36. The secondary piston 86 is slidably disposed in the bore 80 of the housing of the brake pedal unit 14. An outer wall of the secondary piston 86 is engaged with a lip seal 140 and a seal 142 mounted in grooves formed in the housing. One or more passageways 144 are formed through a wall of the secondary piston 86. As shown in FIG. 1, the passageway 144 is located between the lip seal 140 and the seal 142 when the secondary piston 86 is in its rest position. Note that in the rest position the lip seal 140 is just slightly to the left of the passageway 144, thereby permitting fluid communication between the secondary chamber 96 and the reservoir 20 (T2).

If desired, the primary and secondary pistons 84 and 86 may be mechanically connected with limited movement therebetween. The mechanical connection of the primary and secondary pistons 84 and 86 prevents a large gap or distance between the primary and secondary pistons 84 and 86 and prevents having to advance the primary and secondary pistons 84 and 86 over a relatively large distance without any increase in pressure in the non-failed circuit. For example, if the brake system 10 is under a manual push through mode and fluid pressure is lost in the output circuit relative to the secondary piston 86, such as for example in the conduit 36, the secondary piston 86 will be forced or biased in the leftward direction due to the pressure within the primary chamber 94. If the primary and secondary pistons 84 and 86 were not connected together, the secondary piston 86 would freely travel to its further most left-hand position, as viewing FIG. 1, and the driver would have to depress the pedal 70 a distance to compensate for this loss in travel. However, because the primary and secondary pistons 84 and 86 are connected together, the secondary piston 86 is prevented from this movement and relatively little loss of travel occurs in this type of failure. Any suitable mechanical connection between the primary and secondary pistons 84 and 86 may be used. For example, as schematically shown in FIG. 1, the right-hand end of the secondary piston 86 may include an outwardly extending flange that extends into a groove formed in an inner wall of the primary piston 84. The groove has a width which is greater than the width of the flange, thereby providing a relatively small amount of travel between the first and secondary pistons 84 and 86 relative to one another.

The brake pedal unit 14 may include an input spring 150 generally disposed between the input piston 82 and the primary piston 84. Additionally, the brake pedal unit 14 may include a primary spring (not shown) disposed between the primary piston 84 and the secondary piston 86. A secondary spring 152 may be included and disposed between the secondary piston 86 and a bottom wall of the bore 80. The input, primary and secondary springs may have any suitable configuration, such as a caged spring assembly, for biasing the pistons in a direction away from each other and also to properly position the pistons within the housing of the brake pedal unit 14.

The brake system 10 may further include a pressure sensor 156 in fluid communication with the conduit 36 to detect the pressure within the secondary pressure chamber 96 and for transmitting the signal indicative of the pressure to the ECU 22. Additionally, the brake system 10 may further include a pressure sensor 158 in fluid communication with the conduit 34 for transmitting a signal indicative of the pressure at the output of the plunger assembly 18.

Figure 2:
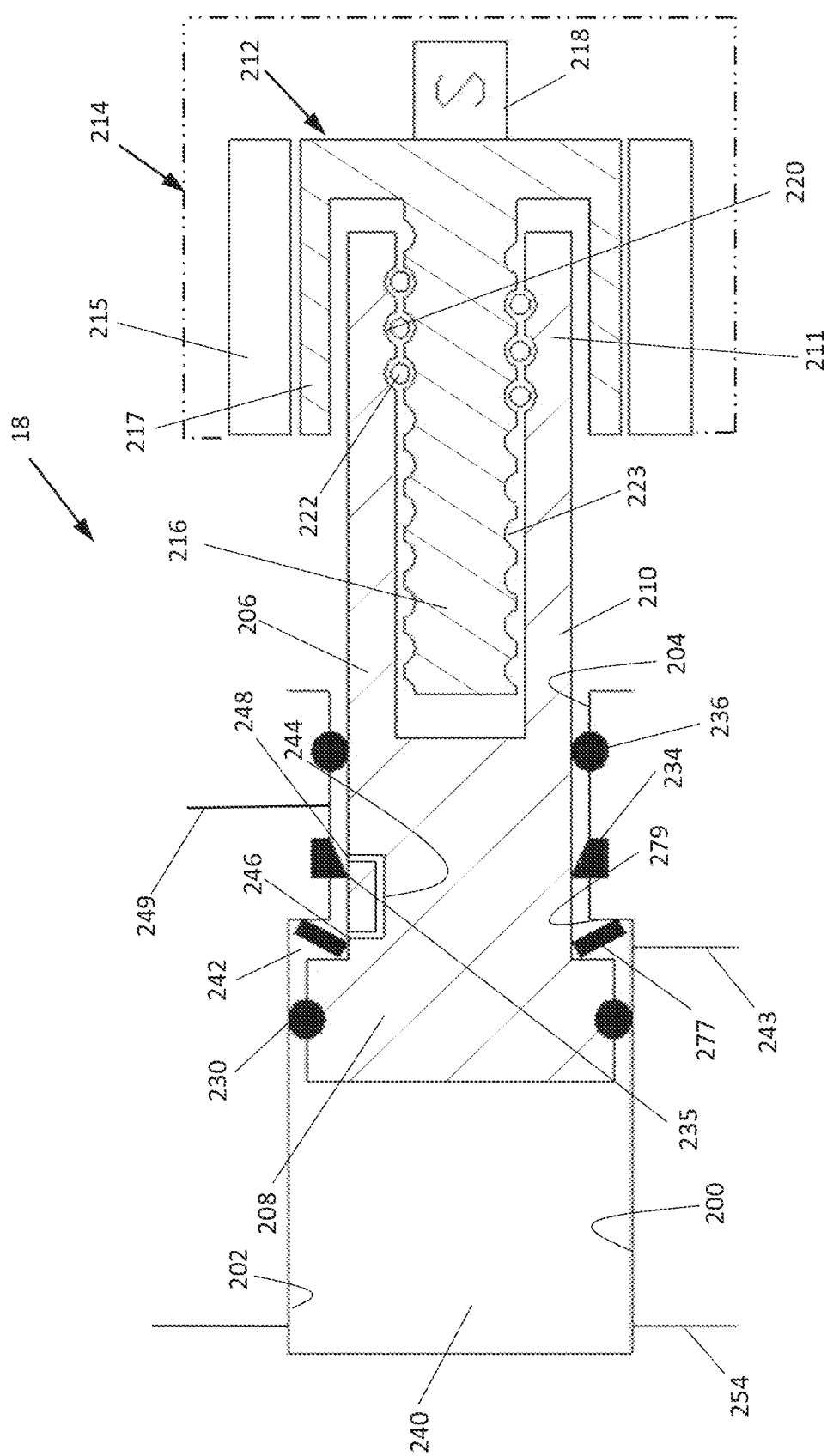
FIG. 2 is an enlarged schematic illustration of the plunger assembly of the brake system of FIG. 1.

As shown schematically in FIG. 2, the plunger assembly 18 includes a housing having a multi-stepped bore 200 formed therein. The bore 200 includes a first portion 202 and a second portion 204. A piston 206 is slidably disposed within the bore 200. The piston 206 includes an enlarged end portion 208 connected to a smaller diameter central portion 210. The piston 206 has a second end 211 connected to a ball screw mechanism, indicated generally at 212. The ball screw mechanism 212 is provided to impart translational or linear motion of the piston 206 along an axis defined by the bore 200 in both a forward direction (leftward as viewing FIGS. 1 and 2), and a rearward direction (rightward as viewing FIGS. 1 and 2) within the bore 200 of the housing. In the embodiment shown, the ball screw mechanism 212 includes a motor 214 rotatably driving a screw shaft 216. The second end 211 of the piston 206 includes a threaded bore 220 and functions as a driven nut of the ball screw mechanism 212. The ball screw mechanism 212 includes a plurality of balls 222 that are retained within helical raceways 223 formed in the screw shaft 216 and the threaded bore 220 of the piston 206 to reduce friction. Although a ball screw mechanism 212 is shown and described with respect to the plunger assembly 18, it should be understood that other suitable mechanical linear actuators may be used for imparting movement of the piston 206. It should also be understood that although the piston 206 functions as the nut of the ball screw mechanism 212, the piston 206 could be configured to function as a screw shaft of the ball screw mechanism 212. Of course, under this circumstance, the screw shaft 216 would be configured to function as a nut having internal helical raceways formed therein. The piston 206 may include structures (not shown) engaged with cooperating structures formed in the housing of the plunger assembly 18 to prevent rotation of the piston 206 as the screw shaft 216 rotates around the piston 206. For example, the piston 206 may include outwardly extending splines or tabs (not shown) that are disposed within longitudinally extending grooves (not shown) formed in the housing of the plunger assembly 18 such that the tabs slide along within the grooves as the piston 206 travels in the bore 200.

As will be discussed below, the plunger assembly 18 is preferably configured to provide pressure to the conduit 34 when the piston 206 is moved in both the forward and rearward directions. The plunger assembly 18 includes a seal 230 mounted on the enlarged end portion 208 of the piston 206. The seal 230 slidably engages with the inner cylindrical surface of the first portion 202 of the bore 200 as the piston 206 moves within the bore 200. A seal 234 and a seal 236 are mounted in grooves formed in the second portion 204 of the bore 200. The seals 234 and 236 slidably engage with the outer cylindrical surface of the central portion 210 of the piston 206. A first pressure chamber 240 is generally defined by the first portion 202 of the bore 200, the enlarged end portion 208 of the piston 206, and the seal 230. A second pressure chamber 242, located generally behind the enlarged end portion 208 of the piston 206, is generally defined by the first and second portions 202 and 204 of the bore 200, the seals 230 and 234, and the central portion 210 of the piston 206. The seals 230, 234, and 236 can have any suitable seal structure.

The plunger assembly 18 preferably includes a sensor, schematically shown as 218, for detecting the position of the piston 206 within the bore 200. The sensor 218 is in communication with the ECU 22. In one embodiment, the sensor 218 may detect the position of the piston 206, or alternatively, metallic or magnetic elements embedded with the piston 206. In an alternate embodiment, the sensor 218 may detect the rotational position of the motor 214 and/or other portions of the ball screw mechanism 212 which is indicative of the position of the piston 206. The sensor 218 can be located at any desired position.

For reasons which will be explained below, the piston 206 of the plunger assembly 18 includes a passageway 244 formed therein. The passageway 244 defines a first port 246 extending through the outer cylindrical wall of the piston 206 and is in fluid communication with the secondary chamber 242. The passageway 244 also defines a second port 248 extending through the outer cylindrical wall of the piston 206 and is in fluid communication with a portion of the bore 200 located between the seals 234 and 236. The second port 248 is in fluid communication with a conduit 249 which is in fluid communication with the reservoir 20 (T3).

Referring back to FIG. 1, the brake system 10 further includes a first plunger valve 250, and a second plunger valve 252. The first plunger valve 250 is preferably a solenoid actuated normally closed valve. Thus, in the non-energized state, the first plunger valve 250 is in a closed position, as shown in FIG. 1. The second plunger valve 252 is preferably a solenoid actuated normally open valve. Thus, in the non-energized state, the second plunger valve 252 is in an open position, as shown in FIG. 1. A check valve may be arranged within the second plunger valve 252 so that when the second plunger valve 252 is in its closed position, fluid may still flow through the second plunger valve 252 in the direction from a first output conduit 254 (from the first pressure chamber 240 of the plunger assembly 18) to the conduit 34 leading to the isolation valves 30 and 32. Note that during a rearward stroke of the piston 206 of the plunger assembly 18, pressure may be generated in the second pressure chamber 242 for output into the conduit 34.

Generally, the first and second plunger valves 250 and 252 are controlled to permit fluid flow at the outputs of the plunger assembly 18 and to permit venting to the reservoir 20 (T3) through the plunger assembly 18 when so desired. For example, the first plunger valve 250 may be energized to its open position during a normal braking event so that both of the first and second plunger valves 250 and 252 are open (which may reduce noise during operation). Preferably, the first plunger valve 250 is almost always energized during an ignition cycle when the engine is running. Of course, the first plunger valve 250 may be purposely moved to its closed position such as during a pressure generating rearward stroke of the plunger assembly 18. The first and second plunger valves 250 and 252 are preferably in their open positions when the piston 206 of the plunger assembly 18 is operated in its forward stroke to maximize flow. When the driver releases the brake pedal 70, the first and second plunger valves 250 and 252 preferably remain in their open positions. Note that fluid can flow through the check valve within the closed second plunger valve 252, as well as through a check valve 258 from the reservoir 20 depending on the travel direction of the piston 206 of the plunger assembly 18.

It may be desirable to configure the first plunger valve 250 with a relatively large orifice therethrough when in its open position. A relatively large orifice of the first plunger assembly 250 helps to provide an easy flow path therethrough. The second plunger valve 252 may be provided with a much smaller orifice in its open position as compared to the first plunger valve 250. One reason for this is to help prevent the piston 206 of the plunger assembly 18 from rapidly being back driven upon a failed event due to the rushing of fluid through the first output conduit 254 into the first pressure chamber 240 of the plunger assembly 18, thereby preventing damage to the plunger assembly 18. As fluid is restricted in its flow through the relatively small orifice, dissipation will occur as some of the energy is transferred into heat. Thus, the orifice should be of a sufficiently small size so as to help prevent a sudden catastrophic back drive of the piston 206 of the plunger assembly 18 upon failure of the brake system 10, such as for example, when power is lost to the motor 214 and the pressure within the conduit 34 is relatively high. As shown in FIG. 2, the plunger assembly 18 may include an optional spring member, such as a spring washer 277, to assist in cushioning such a rapid rearward back drive of the piston 206. The spring washer 277 may also assist in cushioning the piston 206 moving at any such speed as it approaches a rest position near its most retracted position within the bore 200. Schematically shown in FIG. 2, the spring washer 277 is located between the enlarged end portion 208 and a shoulder 279 formed in the bore 200 between the first and second portions 202 and 204. The spring washer 277 can have any suitable configuration which deflects or compresses upon contact with the piston 206 as the piston 206 moves rearwardly. For example, the spring washer 277 may be in the form of a metal conical spring washer. Alternatively, the spring washer 277 may be in the form of a wave spring. Although the spring washer 277 is shown mounted within the bore 200 of the plunger assembly 18, the spring washer 277 may alternatively be mounted on the piston 206 such that the spring washer 277 moves with the piston 206. In this configuration, the spring washer 277 would engage with the shoulder 279 and compress upon sufficient rightward movement of the piston 206.

The first and second plunger valves 250 and 252 provide for an open parallel path between the pressure chambers 240 and 242 of the plunger assembly 18 during a normal braking operation. Although a single open path may be sufficient, the advantage of having both the first and second plunger valves 250 and 252 is that the first plunger valve 250 may provide for an easy flow path through the relatively large orifice thereof, while the second plunger valve 252 may provide for a restricted orifice path during certain failed conditions (when the first plunger valve 250 is de-energized to its closed position.

During a typical or normal braking operation, the brake pedal 70 is depressed by the driver of the vehicle. In a preferred embodiment of the brake system 10, the brake pedal unit 14 includes one or more travel sensors 270 (for redundancy) for producing signals transmitted to the ECU 22 that are indicative of the length of travel of the input piston 82 of the brake pedal unit 14.

During normal braking operations, the plunger assembly 18 is operated to provide pressure to the conduit 34 for actuation of the wheel brakes 12a, 12b, 12c, and 12d. Under certain driving conditions, the ECU 22 communicates with a powertrain control module (not shown) and other additional braking controllers of the vehicle to provide coordinated braking during advanced braking control schemes (e.g., anti-lock braking (AB), traction control (TC), vehicle stability control (VSC), and regenerative brake blending). During a normal brake apply, the flow of pressurized fluid from the brake pedal unit 14, generated by depression of the brake pedal 70, is diverted into the pedal simulator 16. The simulator valve 116 is actuated to divert fluid through the simulator valve 116 from the input chamber 92. Note that the simulator valve 116 is shown in its energized state in FIG. 1. Thus, the simulator valve 116 is a normally closed solenoid valve. Also note that fluid flow from the input chamber 92 to the reservoir 20 is closed off once the passageway 106 in the input piston 82 moves past the seal 104.

During the duration of a normal braking event, the simulator valve 116 remains open, preferably. Also during the normal braking operation, the isolation valves 30 and 32 are energized to secondary positions to prevent the flow of fluid from the conduits 36 and 38 through the isolation valves 30 and 32, respectively. Preferably, the isolation valves 30 and 32 are energized throughout the duration of an ignition cycle such as when the engine is running instead of being energized on and off to help minimize noise. Note that the primary and secondary pistons 84 and 86 are not in fluid communication with the reservoir 20 due to their passageways 136 and 144, respectively, being positioned past the lip seals 132 and 140, respectively. Prevention of fluid flow through the isolation valves 30 and 32 hydraulically locks the primary and secondary chambers 94 and 96 of the brake pedal unit 14 preventing further movement of the primary and secondary pistons 84 and 86.

It is generally desirable to maintain the isolation valves 30 and 32 energized during the normal braking mode to ensure venting of fluid to the reservoir 20 through the plunger assembly 18 such as during a release of the brake pedal 70 by the driver. As best shown in FIG. 1, the passageway 244 formed in the piston 206 of the plunger assembly 18 permits this ventilation.

During normal braking operations, while the pedal simulator 16 is being actuated by depression of the brake pedal 70, the plunger assembly 18 can be actuated by the ECU 22 to provide actuation of the wheel brakes 12a, 12b, 12c, and 12d. The plunger assembly 18 is operated to provide desired pressure levels to the wheel brakes 12a, 12b, 12c, and 12d compared to the pressure generated by the brake pedal unit 14 by the driver depressing the brake pedal 70. The electronic control unit 22 actuates the motor 214 to rotate the screw shaft 216 in the first rotational direction. Rotation of the screw shaft 216 in the first rotational direction causes the piston 206 to advance in the forward direction (leftward as viewing FIGS. 1 and 2). Movement of the piston 206 causes a pressure increase in the first pressure chamber 240 and fluid to flow out of the first pressure chamber 240 and into the conduit 254. Fluid can flow into the conduit 34 via the open first and second plunger valves 250 and 252. Note that fluid is permitted to flow into the second pressure chamber 242 via a conduit 243 as the piston 206 advances in the forward direction. Pressurized fluid from the conduit 34 is directed into the conduits 40 and 42 through the isolation valves 320 and 322. The pressurized fluid from the conduits 40 and 42 can be directed to the wheel brakes 12a, 12b, 12c, and 12d through open apply valves 50, 54, 58, and 62 while the dump valves 52, 56, 60, and 64 remain closed. When the driver lifts off or releases the brake pedal 70, the ECU 22 can operate the motor 214 to rotate the screw shaft 216 in the second rotational direction causing the piston 206 to retract withdrawing the fluid from the wheel brakes 12a, 12b, 12c, and 12d. The speed and distance of the retraction of the piston 206 is based on the demands of the driver releasing the brake pedal 70 as sensed by the sensor 218. Under certain conditions, the pressurized fluid from the wheel brakes 12a, 12b, 12c, and 12d may assist in back-driving the ball screw mechanism 212 moving the piston 206 back towards its rest position.

In some situations, the piston 206 of the plunger assembly 18 may reach its full stroke length within the bore 200 of the housing and additional boosted pressure is still desired to be delivered to the wheel brakes 12*a*, 12*b*, 12*c*, and 12*d*. The plunger assembly 18 is a dual acting plunger assembly such that it is configured to also provide boosted pressure to the conduit 34 when the piston 206 is stroked rearwardly (rightward) or in a reverse direction. This has the advantage over a conventional plunger assembly that first requires its piston to be brought back to its rest or retracted position before it can again advance the piston to create pressure within a single pressure chamber. If the piston 206 has reached its full stroke, for example, and additional boosted pressure is still desired, the second plunger valve 252 is energized to its closed check valve position. The first plunger valve 250 is de-energized to its closed position. The electronic control unit 22 actuates the motor 214 in a second rotational direction opposite the first rotational direction to rotate the screw shaft 216 in the second rotational direction. Rotation of the screw shaft 216 in the second rotational direction causes the piston 206 to retract or move in the rearward direction (rightward as viewing FIGS. 1 and 2). Movement of the piston 206 causes a pressure increase in the second pressure chamber 242 and fluid to flow out of the second pressure chamber 242 and into the conduit 243 and the conduit 34. Pressurized fluid from the conduit 34 is directed into the conduits 40 and 42 through the isolation valves 30 and 32. The pressurized fluid from the conduits 40 and 42 can be directed to the wheel brakes 12*a*, 12*b*, 12*c*, and 12*d* through the opened apply valves 50, 54, 58, and 62 while dump valves 52, 56, 60, and 64 remain closed. In a similar manner as during a forward stroke of the piston 206, the ECU 22 can also selectively actuate the apply valves 50, 54, 58, and 62 and the dump valves 52, 56, 60, and 64 to provide a desired pressure level to the wheel brakes 12*a*, 12*b*, 12*c*, and 12*d*, respectively. When the driver lifts off or releases the brake pedal 70 during a pressurized rearward stroke of the plunger assembly 18, the first and second plunger valves 250 and 252 are preferably operated to their open positions, although having only one of the valves 250 and 252 open would generally still be sufficient. Note that when transitioning out of a slip control event, the ideal situation would be to have the position of the piston 206 and the displaced volume within the plunger assembly 18 correlate exactly with the given pressures and fluid volumes within the wheel brakes 12*a*, 12*b*, 12*c*, and 12*d*. However, when the correlation is not exact, fluid can be drawn from the reservoir 20 via the check valve 258 into the chamber 240 of the plunger assembly 18.

During a braking event, the ECU 22 can selectively actuate the apply valves 50, 54, 58, and 62 and the dump valves 52, 56, 60, and 64 to provide a desired pressure level to the wheel brakes, respectively. The ECU 22 can also control the brake system 10 during ABS, DRP, TC, VSC, regenerative braking, and autonomous braking events by general operation of the plunger assembly 18 in conjunction with the apply valves and the dump valves. Even if the driver of the vehicle is not depressing the brake pedal 70, the ECU 22 can operate the plunger assembly 18 to provide a source of pressurized fluid directed to the wheel brakes, such as during an autonomous vehicle braking event.

In the event of a loss of electrical power to portions of the brake system 10, the brake system 10 provides for manual push through or manual apply such that the brake pedal unit 14 can supply relatively high pressure fluid to the conduits 36 and 38. During an electrical failure, the motor 214 of the plunger assembly 18 might cease to operate, thereby failing to produce pressurized hydraulic brake fluid from the plunger assembly 18. The isolation valves 30 and 32 will shuttle (or remain) in their positions to permit fluid flow from the conduits 36 and 38 to the wheel brakes 12*a*, 12*b*, 12*c*, and 12*d*. The simulator valve 116 is shuttled to its closed position to prevent fluid from flowing out of the input chamber 92 to the pedal simulator 16. During the manual push-through apply, the input piston 82, the primary piston 84, and the secondary piston 86 will advance leftwardly such that the passageways 106, 136, 144 will move past the seals 102, 132, and 140, respectively, to prevent fluid flow from their respective fluid chambers 92, 94, and 96 to the reservoir 20, thereby pressurizing the chambers 92, 94, and 96. Fluid flows from the chambers 94 and 96 into the conduits 38 and 36, respectively, to actuate the wheel brakes 12*a*, 12*b*, 12*c*, and 12*d*.

Figure 3:
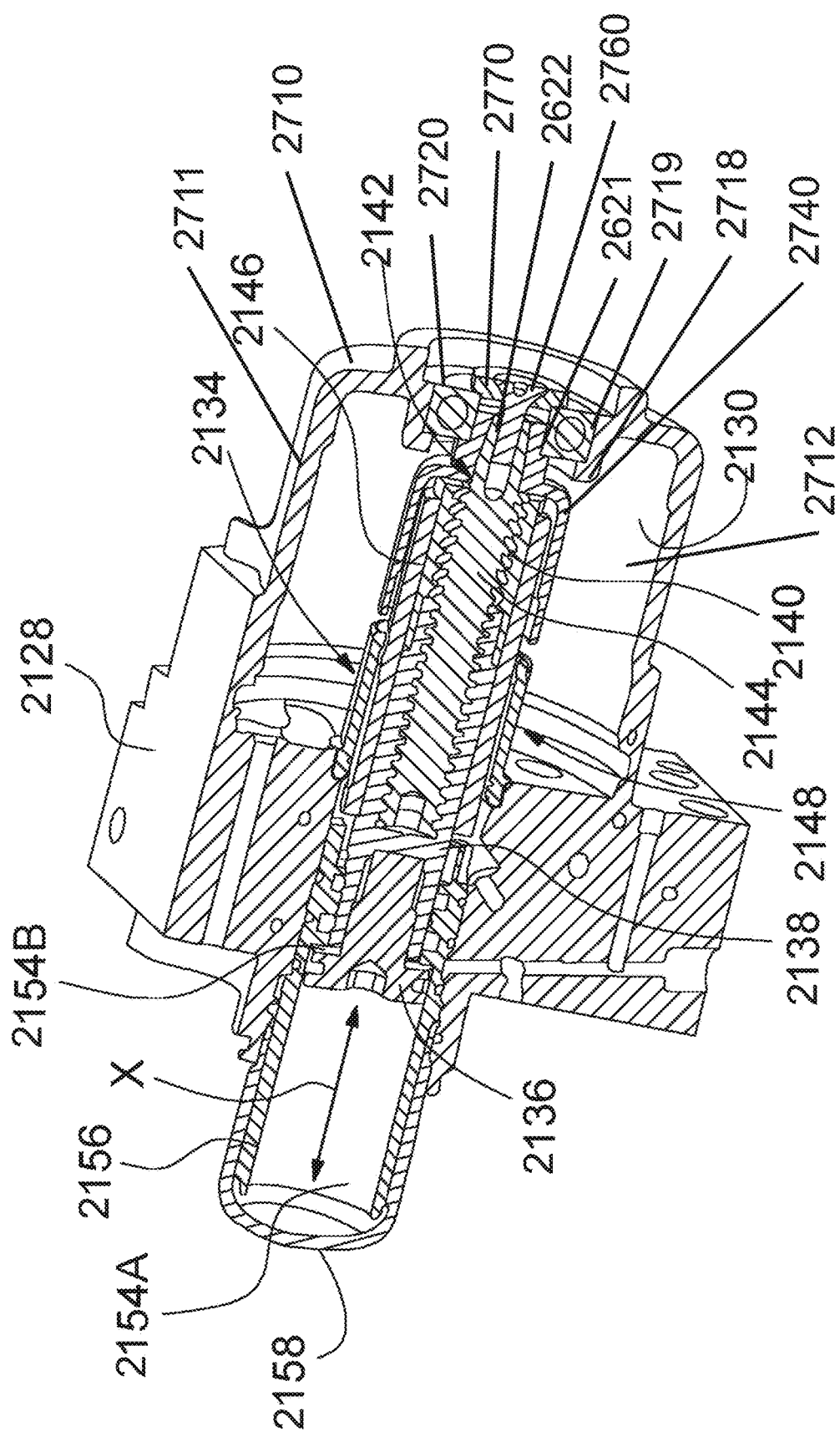
FIG. 3 is a schematic illustration of a first embodiment of a plunger assembly in accordance with the invention.

Referring now to FIG. 3, the plunger assembly includes an output housing 2128, an electric motor 2130, and an input housing 2132. Supported on the housing 2128 is a plunger, indicated generally at 2134. The plunger 2134 may be dual acting and includes a plunger head 2136 attached to a rod 2138. The rod 2138 has a threaded portion 2140. A ball screw assembly, indicated generally at 2142, operates as known to those skilled in the art. The ball screw assembly 2142 includes a screw shaft 2144, ball bearings (not illustrated) between the threaded portion 2140 and screw shaft 2144 such that the threaded portion 2140 is supported on the screw shaft 2144. An anti-rotation tube 2146 is supported on the housing 2128 by a torque coupler, indicated generally at 2148. The torque coupler 148 is attached or secured between the housing 2128 and anti-rotation tube 2146. For example, the torque coupler 2148 may be press fit to each of the housing 2128 and anti-rotation tube 2146.

The anti-rotation tube 2146 restrains the threaded portion 2140 from rotation. The anti-rotation tube 2146 has internal ridges 2150 corresponding to slots 2152 on the threaded portion 2140. When the ridges 2150 are inserted in the slots 2152, the rod 2138 is restrained from rotating. As such, when the screw shaft 2144 is driven or rotated by the motor 2130, the head 2136 and rod 2138 move or translate in a first direction X. As illustrated, the plunger 2134 is in an unactuated, rightward position. As the motor 2130 drives the screw shaft 2144, the head 2136 moves between the rightward position and a leftward position (not illustrated).

The movement of the plunger 2134 pressurizes brake fluid in first and second annular chambers 2154A and 2154B, respectively, such that brake pressure is generated for the brake system 2102. The first chamber 2154A is defined by the head 2136, a sleeve 2156, and an end cap 2158 and the second chamber 2154B is defined between the head 2136, rod 2138, and sleeve 2156. Typically, the first and second chambers 2154A and 2154B, respectively, are hydraulically linked. Pressure in the first and second chambers 2154A and 2154B, respectively, rises as the plunger 2134 moves away from the motor 2130 and falls as the plunger 2134 moves toward the motor 2130. During events such as slip control, the first and second chambers 2154A and 2154B, respectively, may be hydraulically isolated when the plunger 2134 is moving towards the motor 2130. When the first and second chambers 2154A and 2154B, respectively, are isolated, pressure in the second chamber 2154B rises and fluid from a reservoir (not shown) flows into the first chamber 2154A.

As shown in FIG. 3, the embodied electric motor 2130 comprises a motor housing 2710 for supporting a stator (not shown) that rotates a rotor 2740. The motor housing 2710 comprises a generally cylindrical enclosure 2711 with a bore 2712 extending from a front side 2713 to a back side 2714 of the cylindrical enclosure 2711. The bore 2712 opening on the back side of the cylindrical enclosure 2711 has stepped down diameter to define a front bearing stop 2718. A bearing support surface 2719 is adjacent the front bearing stop 2718, with a generally horizontal surface for supporting the outer race of a bearing 2720. The stator (not shown) is mounted within the cylindrical enclosure 2711, between the front and back sides with the outer circumferential surface of the stator adjacent the bore 2712. The bearing 2720 is positioned within the cylindrical enclosure 2711 such that the front side of the outer race of the bearing 2720 is proximate to the front bearing stop 2718 and the outermost portion of the outer race is proximate the bearing support surface 2719. In the illustrated embodiment, one end of the rotor 2740 is supported in the motor housing 2710 by engaging the inner race of the bearing 2720. The rotor 2740 rotor further defines a tapered bore 2741 for receiving a corresponding tapered end 2621 of the screw shaft 2144. In the illustrated embodiment, the screw shaft 2144 has a threaded bore 2622 for receiving a threaded fastener 2760. When threaded into the screw shaft 2144, the threaded fastener 2760 passes through a washer 2770 and then through the opening in the bearing 2720. The threaded fastener 2760 is then threaded into the threaded bore 2622 of the screw shaft 2144 and thus is also passes through the center of the rotor 2740. The clamping force provided by the threaded fastener 2760 compresses the washer 2770 against one side of the inner race of the bearing 2720 and urges the screw shaft 2144 toward the second side of the bearing 2720. The tapered end 2621 of the screw shaft 2144 frictionally engages the tapered bore 2741 of the rotor 2740, thus transferring a force that causes the rotor 2740 to frictionally engage the other side of the inner race of the bearing 2720.

Figure 4:
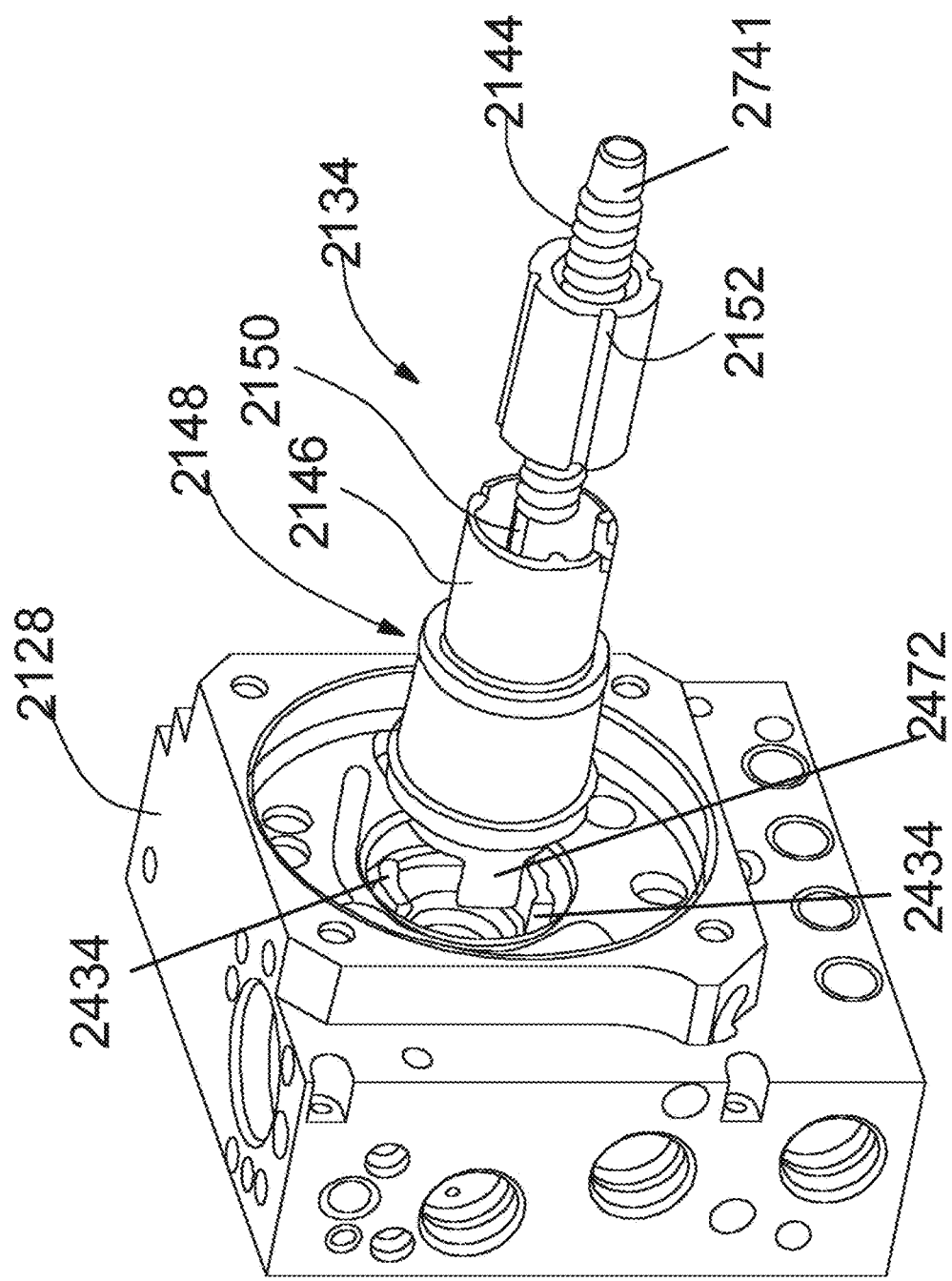
FIG. 4 is a schematic illustration, in a partially exploded view, of a portion of the plunger assembly of FIG. 3.

As shown in FIG. 4, one or more sleeve tabs 2472 project from the sleeve 2156 to form a loose interlocking connection with anti-rotation tube tabs 2434 on the anti-rotation tube 2146. The tolerances between the anti-rotation tube tabs 2434 and the sleeve tabs 2472 will allow for some rotational movement of the anti-rotation tube 2146, due to the elastic properties of the torque coupler 2148, without coming into contact with each other. It is also within the scope of the invention that the tolerances between the anti-rotation tube tabs 2434 and the sleeve tabs 2472 are such that rotation of the anti-rotation tube 2430 is limited to the respective tabs coming into contact with one another.

Figure 5:
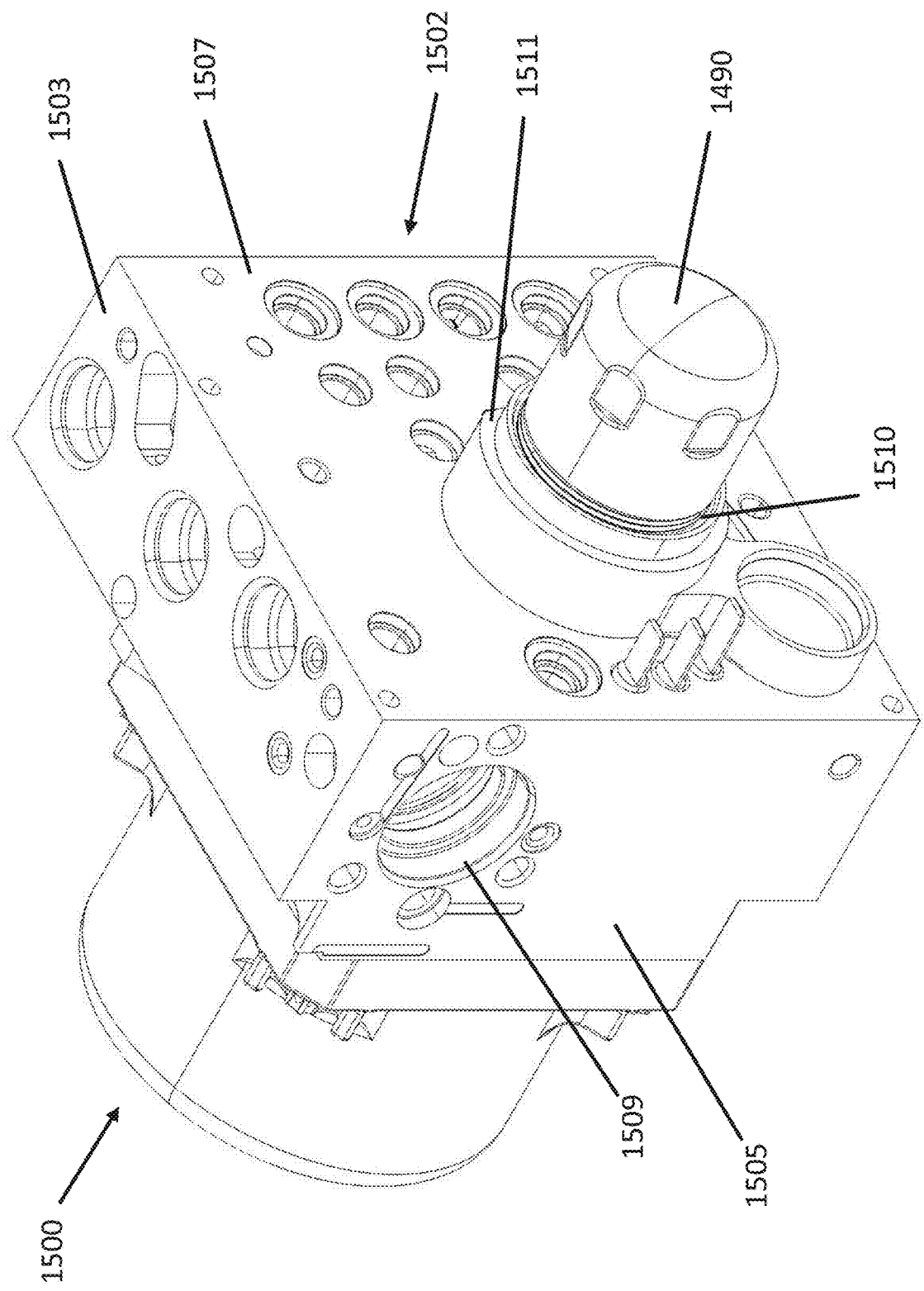
FIG. 5 is a perspective view of a second embodiment of a plunger assembly.
Figure 6:
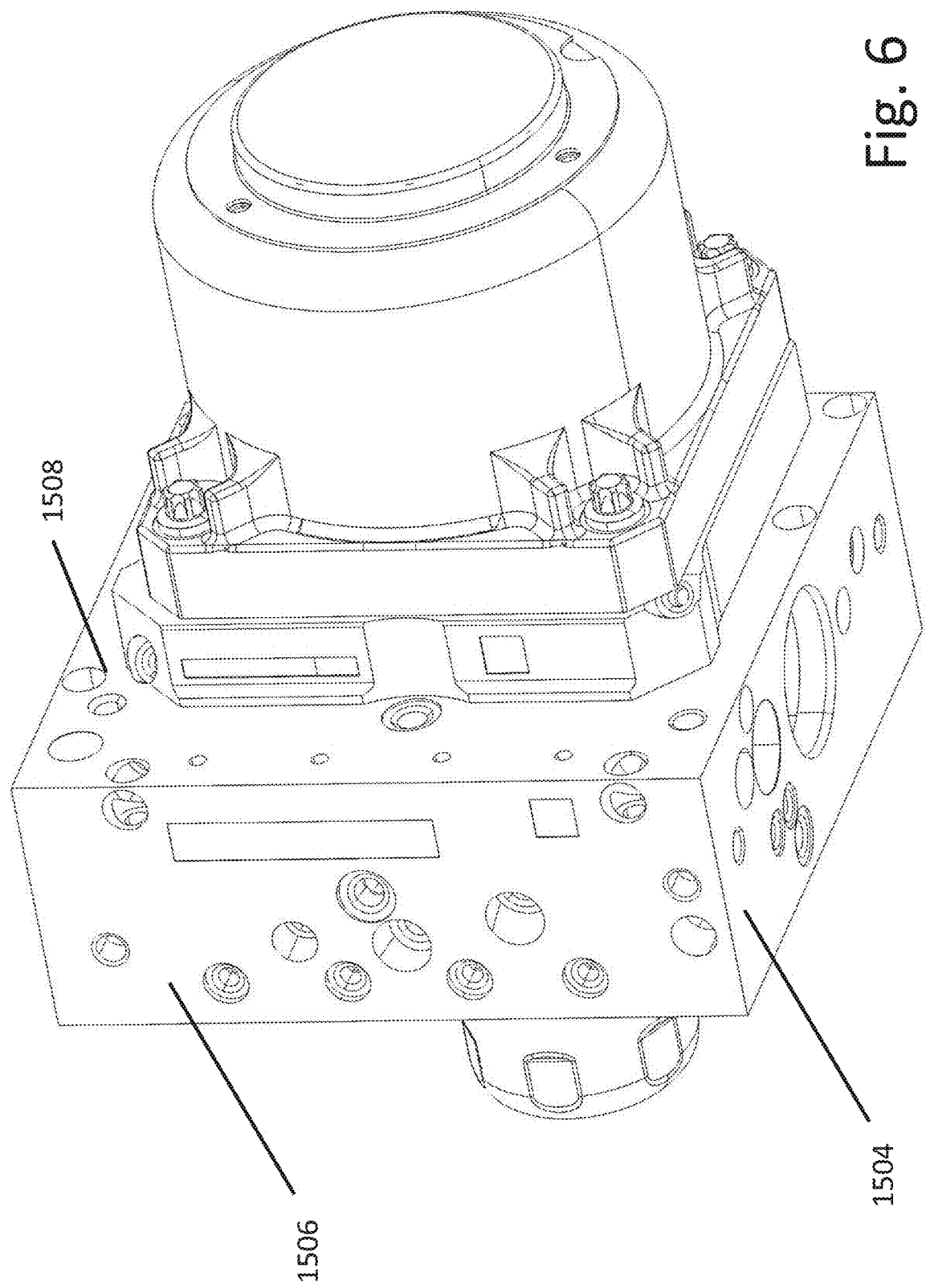
FIG. 6 is a perspective view of an opposite side of the plunger assembly of FIG. 5.

There is illustrated in FIGS. 5 and 6 an alternate embodiment of a braking system assembly 1500. The braking assembly 1500 includes a housing 1502 generally comprised of six sides: top 1503, bottom 1504, first 1505, second 1506, front 1507, and back 1508. The housing 1502 may be formed as a single unit, as shown, or include two or more separately formed portions coupled together. The housing 1502 generally includes a first bore 1509 located in the first side of the housing 1502, and a second bore 1510 extending between the front 1507 and back sides 1508. A brake pedal unit similar to embodiments described above, but not shown in FIGS. 5 and 14, includes an input piston. The input piston is slidably disposed in the first bore 1509 to actuate the master cylinder grouping. A plunger assembly, indicated generally at 1400, is slidably disposed in the second bore 1510, the purpose and function of which will be described in further detail below. In addition, the illustrated embodiment of the housing 1502 further comprises a threaded raised end cap mount 1511 extending from the second bore for securing an end cap 1490 to the housing 1502. In another embodiment, the raised end cap mount 1511 may be generally flush with the front surface 1507 permitting the end cap 1490 to be directly connected to the surface of the housing 1502. The second bore 1510 may comprise multiple stepped diameters for housing various components described below. In addition, the housing 1502 may also define additional openings or bores for valves, ECU connections, reservoir connections, conduits, and brake line attachments.

Figure 7:
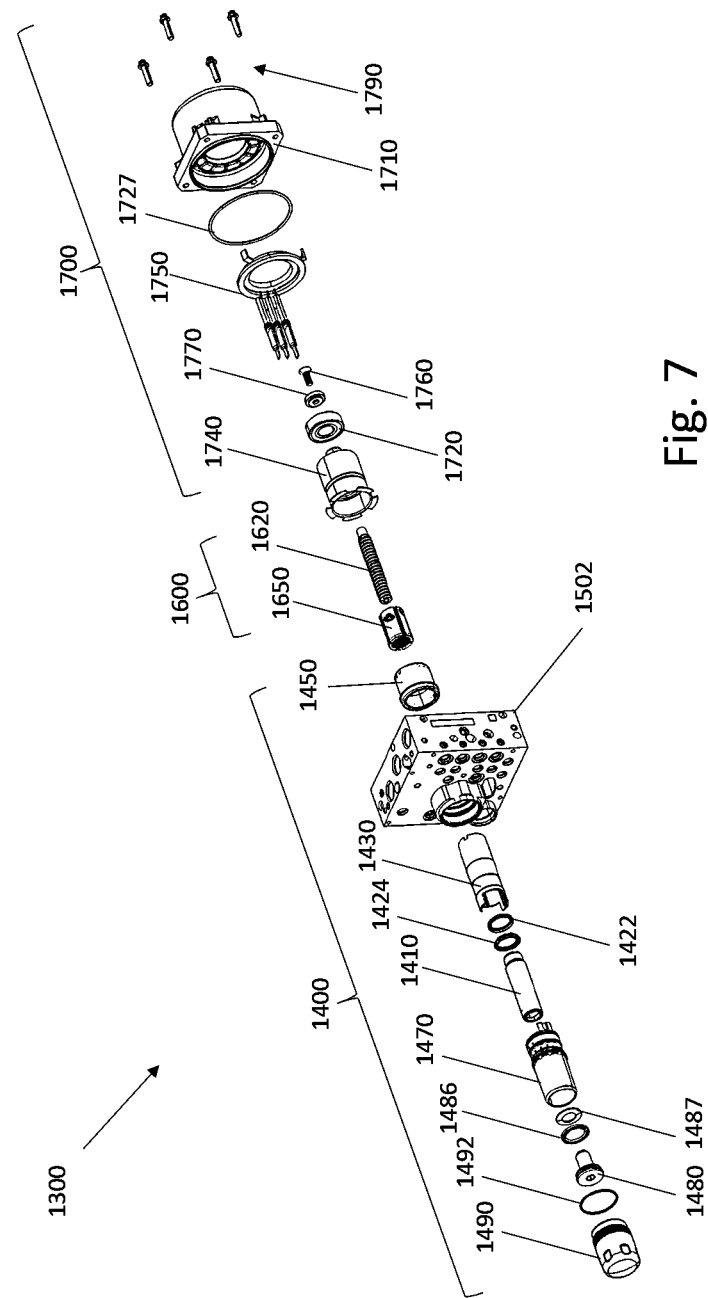
FIG. 7 is an exploded perspective view of the plunger assembly of FIGS. 4 and 5.
Figure 8:
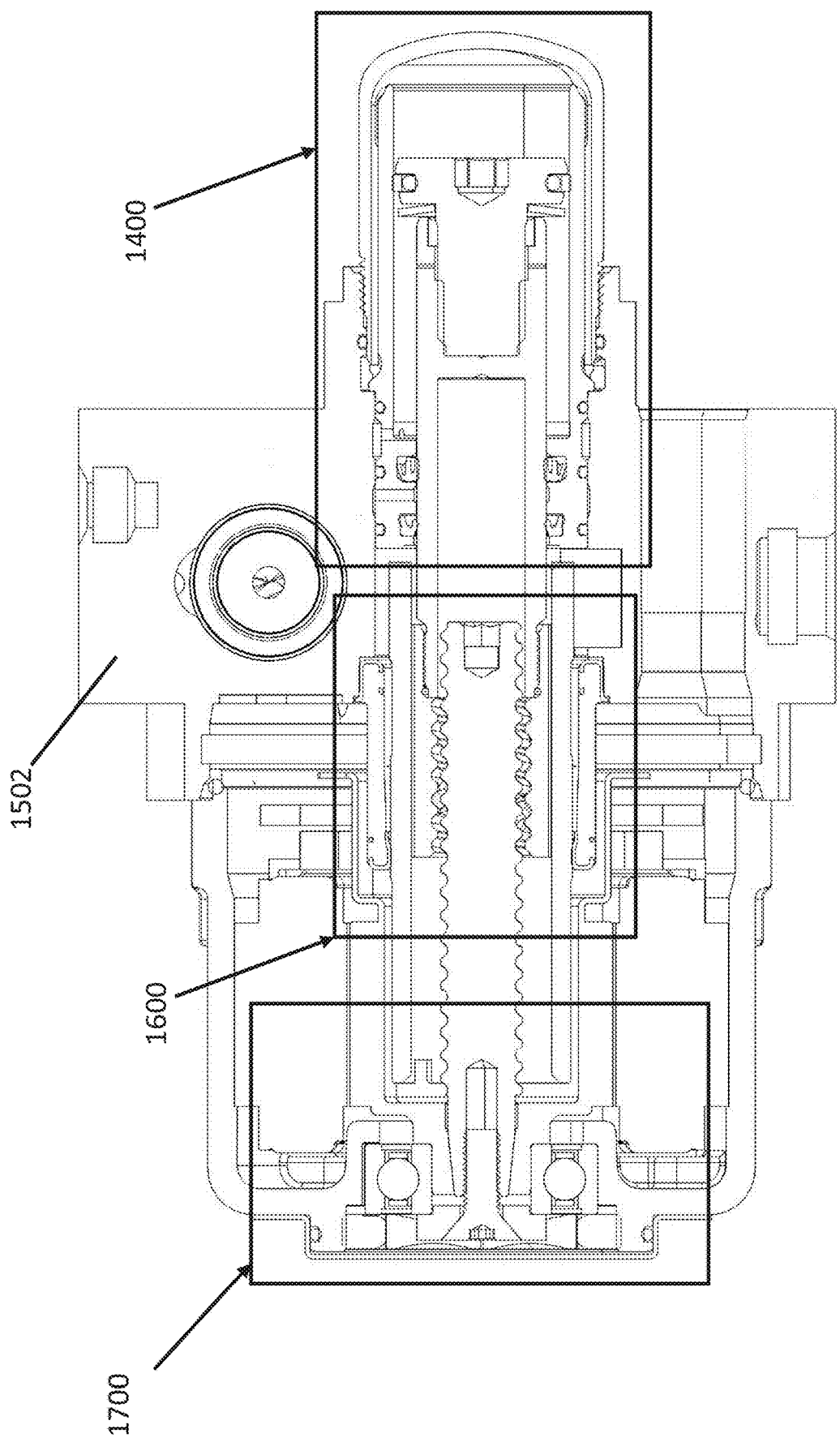
FIG. 8 is an elevational view, in cross section, of the plunger assembly of FIG. 4.

As shown in an exploded view in FIG. 7 and a cross sectional view in FIG. 8, the braking system 1500 comprises a power transmission unit grouping 1300. The illustrated power transmission unit 1300 comprises the plunger assembly, generally indicated as 1400, a ball nut assembly 1600, and a motor assembly 1700. In operation, a rotational movement of the motor assembly 1700 will drive a portion of the ball nut assembly 1600 in a rotational manner. The operation of the ball nut assembly 1600 will then convert the rotational movement of the motor assembly 1700 into a linear movement along the axis of rotation. The linear movement of a portion of the ball nut assembly 1600 is then transferred to a portion of the plunger assembly 1400 where the linear movement drives a pressurizing structure, such as a piston/cylinder arrangement, to generate a fluid pressure force that can be used for actuation of the wheel brakes.

As shown in FIGS. 9-13, the embodied motor assembly 1700 comprises an electric motor, known to those skilled in the art as having a motor housing 1710 for supporting a stator 1730 that rotates a rotor 1740. The motor housing 1710 comprises a generally cylindrical enclosure 1711 with a bore 1712 extending from a front side 1713 to a back side 1714 of the cylindrical enclosure 1711. A mounting surface 1715 and front lip 1716 define a front seal groove 1717 adjacent the bore 1712 opening on the front side. The bore 1712 opening on the back side of the cylindrical enclosure has stepped down diameter to define a front bearing stop 1718. A bearing support surface 1719 is adjacent the front bearing stop 1718, with a generally horizontal surface for supporting the outer race of a bearing 1720. The bearing support surface 1719 is adjacent to a larger diameter bore with a horizontally extending surface forming a nut support surface 1721. The nut support surface 1721 may further include threads or other fastening means for securing a nut 1722. Further, the back side of the cylindrical enclosure 1711 may also comprise a back lip 1723 forming a portion of the nut support surface 1721 on the interior, and also define a back seal groove 1724 on the exterior.

The stator 1730 is mounted within the cylindrical enclosure, between the front and back sides with the outer circumferential surface of the stator 1730 adjacent the bore 1712. The bearing 1720 is positioned within the cylindrical enclosure 1711 such that the front side of the outer race of the bearing 1720 is proximate to the front bearing stop 1718 and the outer diameter of the outer race is proximate the bearing support surface 1719. The nut 1722 comprises a threaded outer circumferential surface that threads into the nut support surface 1721. A portion of the nut 1722 will then be proximate to or abutting the outer race of the bearing 1720, thus securing the position of the bearing 1720 relative to the cylindrical enclosure 1711. In order to enclose the back side of the cylindrical enclosure 1711, a back side seal 1725 is set in the back seal groove 1724. A cover plate 1726 is mounted to the cylindrical enclosure 1711 such that the back side seal is pressed against a portion of the cover plate 1726 to prevent the ingress or egress of contaminants. In a similar regard, the front side of the cylindrical enclosure 1711 is mounted to the housing 1502 with the mounting surface 1715 proximate the back side 1508 of the housing 1502. In order to prevent contaminant ingress between the housing 1502 and the cylindrical enclosure 1711, a front side seal 1727 is set in the front side seal groove 1717. The front lip 1716 is inserted into the second bore 1510 such that the front side seal 1727 engages the interior surface of the second bore 1510. In addition, a plurality of fasteners further secure the cylindrical enclosure 1711 to the housing 1502.

Figure 9:
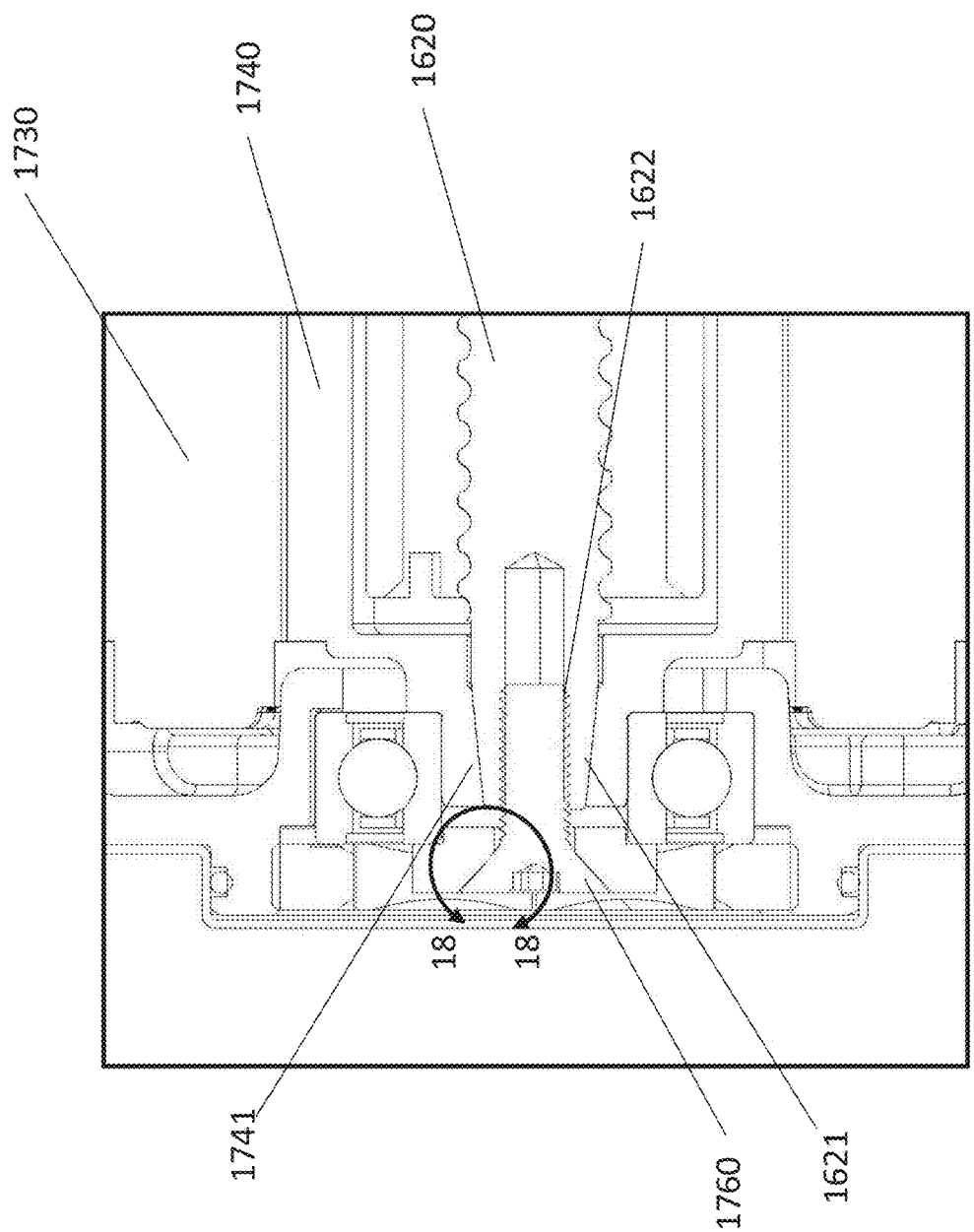
FIG. 9 is an enlarged elevational view, in cross section, of a connection of the plunger assembly of FIG. 8.
Figure 10:
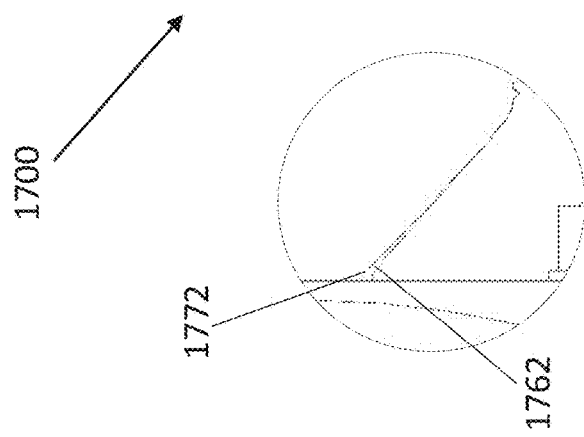
FIG. 10 is an enlarged view, in cross section, of the connection of the plunger assembly of FIG. 9, taken at 18-18.
Figure 11:
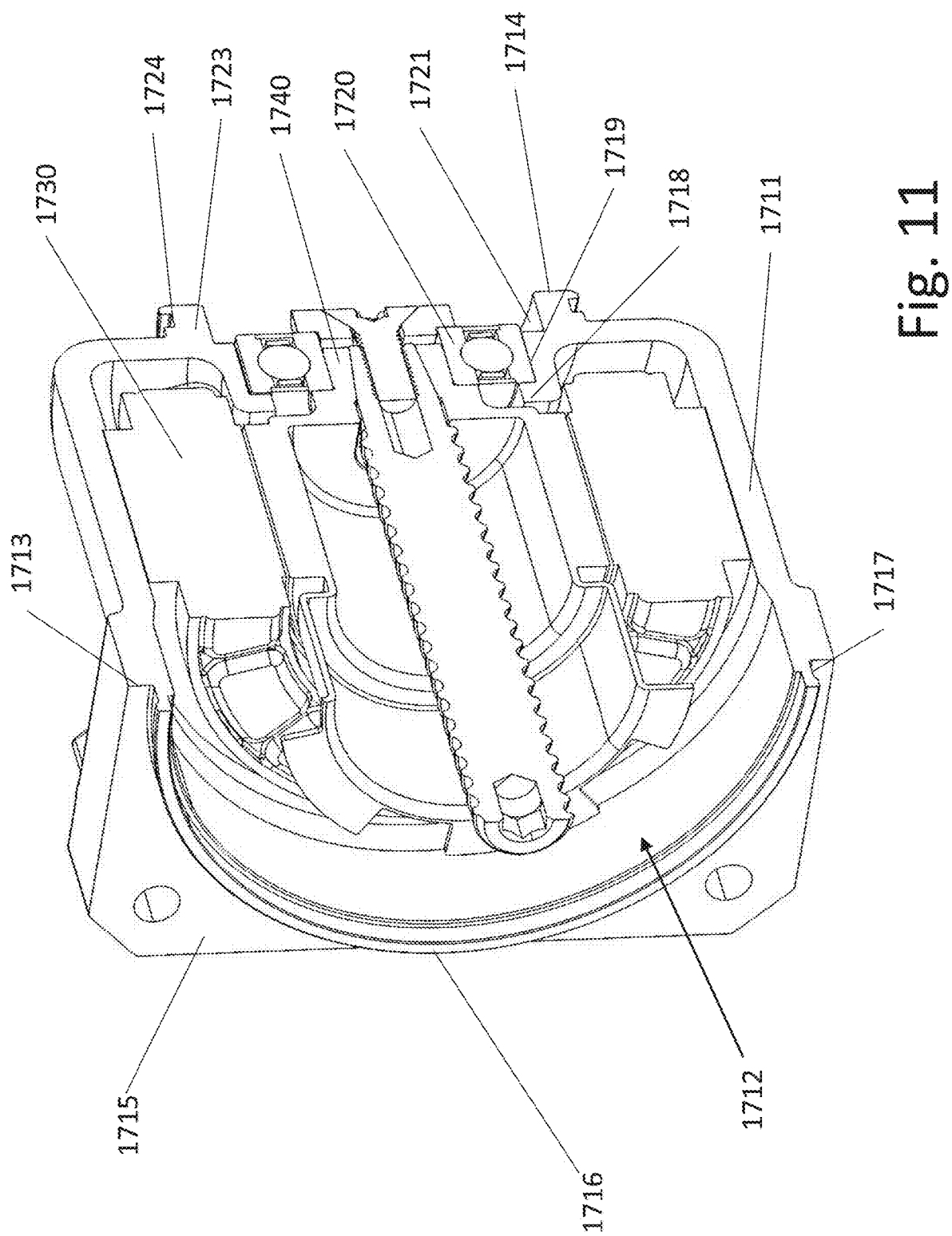
FIG. 11 is a perspective view, in cross section, of the motor and ball screw sub assembly of the plunger assembly of FIG. 8.
Figure 12:
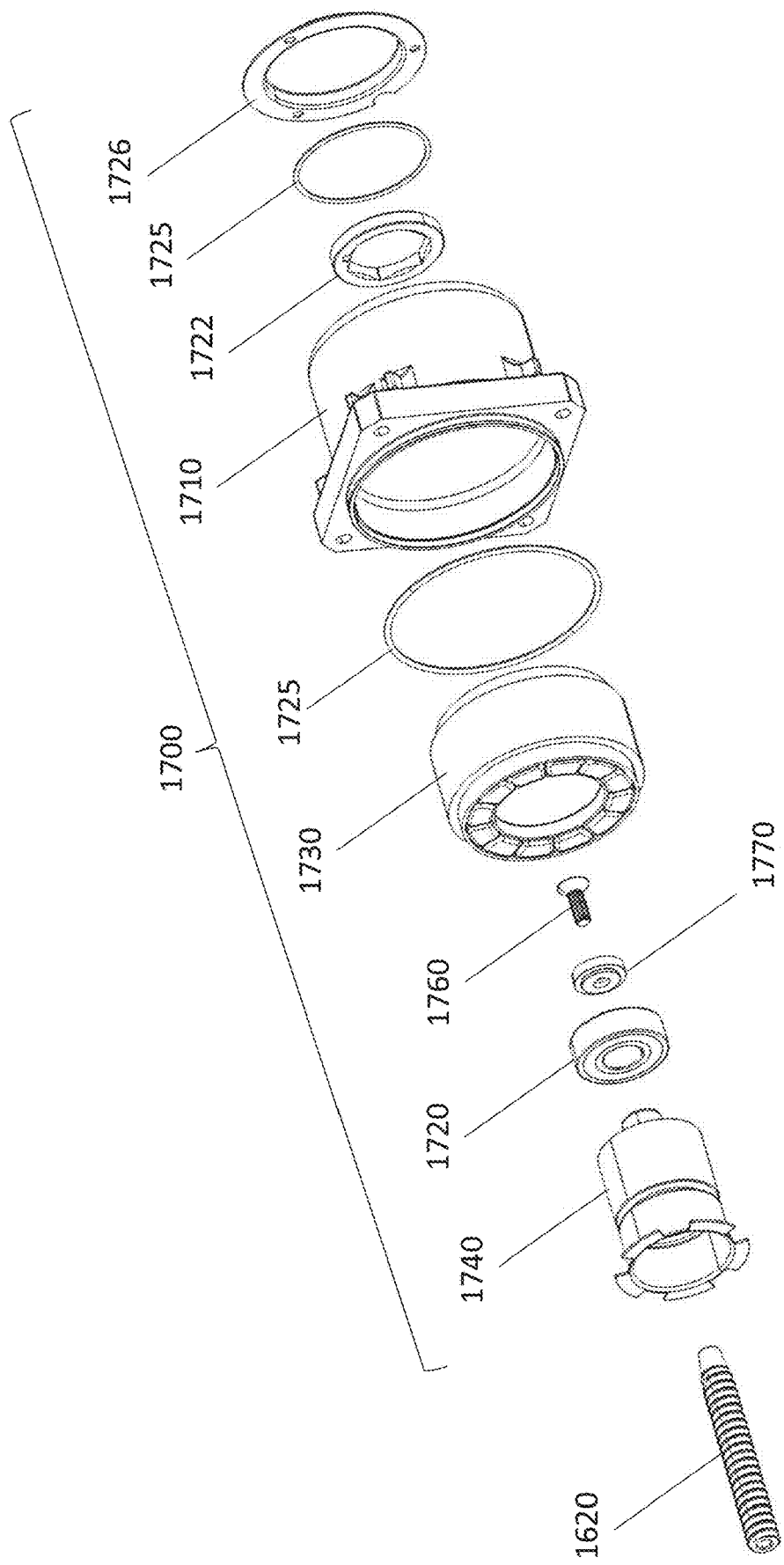
FIG. 12 is an exploded, perspective view of the motor and ball screw sub assembly of FIG. 11.

In the illustrated embodiment, one end of the rotor 1740 is supported in the motor housing 1710 by engaging the inner race of the bearing 1720. As shown in FIGS. 9 and 10, the rotor 1740 further defines a tapered bore 1741 for receiving a corresponding tarped end 1621 of a ball screw 1620. In the illustrated embodiment, the ball screw 1620 has a threaded bore 1622 for receiving a threaded fastener 1760. When threaded into the ball screw 1620, the threaded fastener 1760 passes through a washer 1770 and then through the opening in the bearing 1720. The threaded fastener 1760 is then threaded into the threaded bore 1622 of the ball screw 1620 and thus is also passes through the center of the rotor 1740. As shown in FIGS. 9 and 10, the fastener 1760 includes a tapered head 1762 that engages a mating tapered surface 1772 on the washer 1770. The fit between these mating tapers is such that contact between the surfaces initiates at a point near the base of the head toward the threaded section of the fastener 1760. As the fastener is drawn into contact with the washer, the tapered surfaces come together though the stress distribution along the taper interface is higher toward the threaded end. This "oil can" effect creates a non-uniform load and stress distribution along the taper interface. This non-uniform stress distribution at the head end of the fastener causes the resultant preload forces acting on the connection to be applied toward the threads of the fastener, rather than concentrated at the fastener/washer interface. By shifting the preload forces into the threads, the integrity of the connection is maintained in response to repeated torsional impact loads from inertial forces during the many cyclic start/stop events as the plunger system is operated.

The clamping force provided by the threaded fastener 1760 compresses the washer 1770 against one side of the inner race of the bearing 1720 and urges the ball screw 1620 toward the second side of the bearing 1720. The tapered end 1621 of the ball screw 1620 frictionally engages the tapered bore 1741 of the rotor 1740, thus transferring a force that causes the rotor 1740 to frictionally engage the other side of the inner race of the bearing 1720. In one embodiment, this frictional fit is the primary torque driving mechanism between the rotor 1740 and the ball screw 1620. In this particular embodiment, the degree of frictional fit between the ball screw taper 1621 and mating taper bore 1741 of the rotor 1740 does not cause an expansion of the rotor hub that engages the inner race of the bearing. By preventing a radial preload of the inner race of the bearing, the fit of the rolling elements between the inner and outer races remains generally unchanged, thus reducing parasitic losses from increased frictional forces.

In an alternate embodiment, however, a bearing assembly having clearances sufficient to permit radial expansion of the inner race may be provided. In this embodiment, as the tapered end 1621 is drawn within the tapered bore 1741, a portion of the rotor 1740 that extends into the inner diameter of bearing 1720 may be displaced radially against the inner race of the bearing 1729. The added clearance in the bearing is taken up by radial expansion to provide a desired rolling element fit. Thus, the connection of the ball screw to rotor is further compressed to provide additional compressive stresses to resist torsional impact loads, experienced during operation, that resist loosening of the connection.

Figure 13:
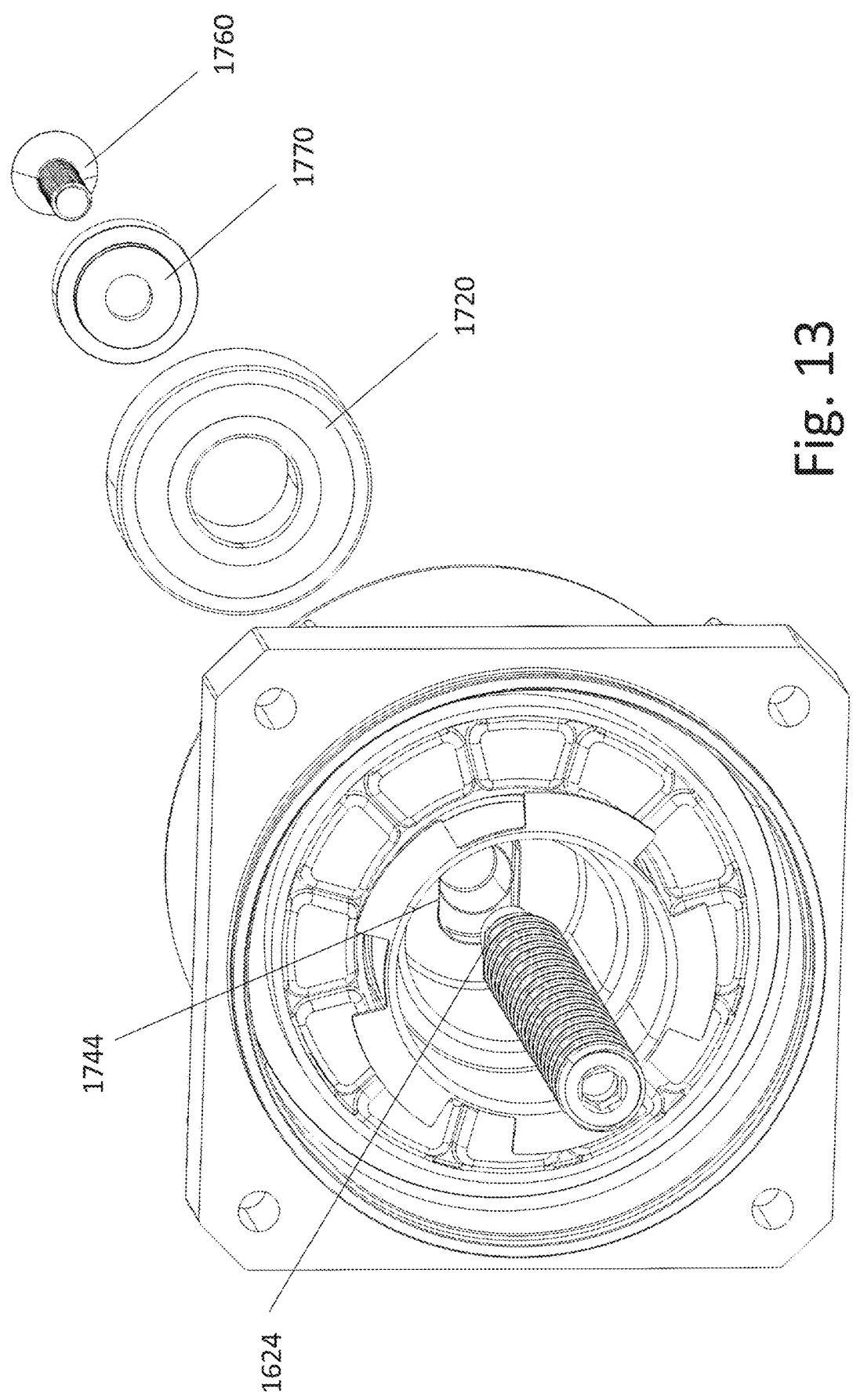
FIG. 13 is a partially exploded, perspective view of the motor and ball screw sub assembly of FIG. 11.

In addition, it is within the scope of the invention that the ball screw 1620 may have one or more flats 1624 adjacent or as part of the tapered end 1621, as shown in FIG. 13. The one or more flats 1624 correspond to one or more respective flats 1744 on the rotor 1740 surface. When assembled, the ball screw flats 1624 and rotor flats 1744 will be in an abutting or nearly abutting relationship. Thus, it is within the scope of the invention that a redundant torque transfer mechanism is provided between the rotor 1740 and the ball screw 1620, in the event of a loss of friction between the tapered surfaces (1621 and 1741). It is further within the scope of this invention that one of the above described torque transmission mechanisms can be provided without the other mechanism and retain the intended purpose and operation of the braking system 1500.

Figure 14:
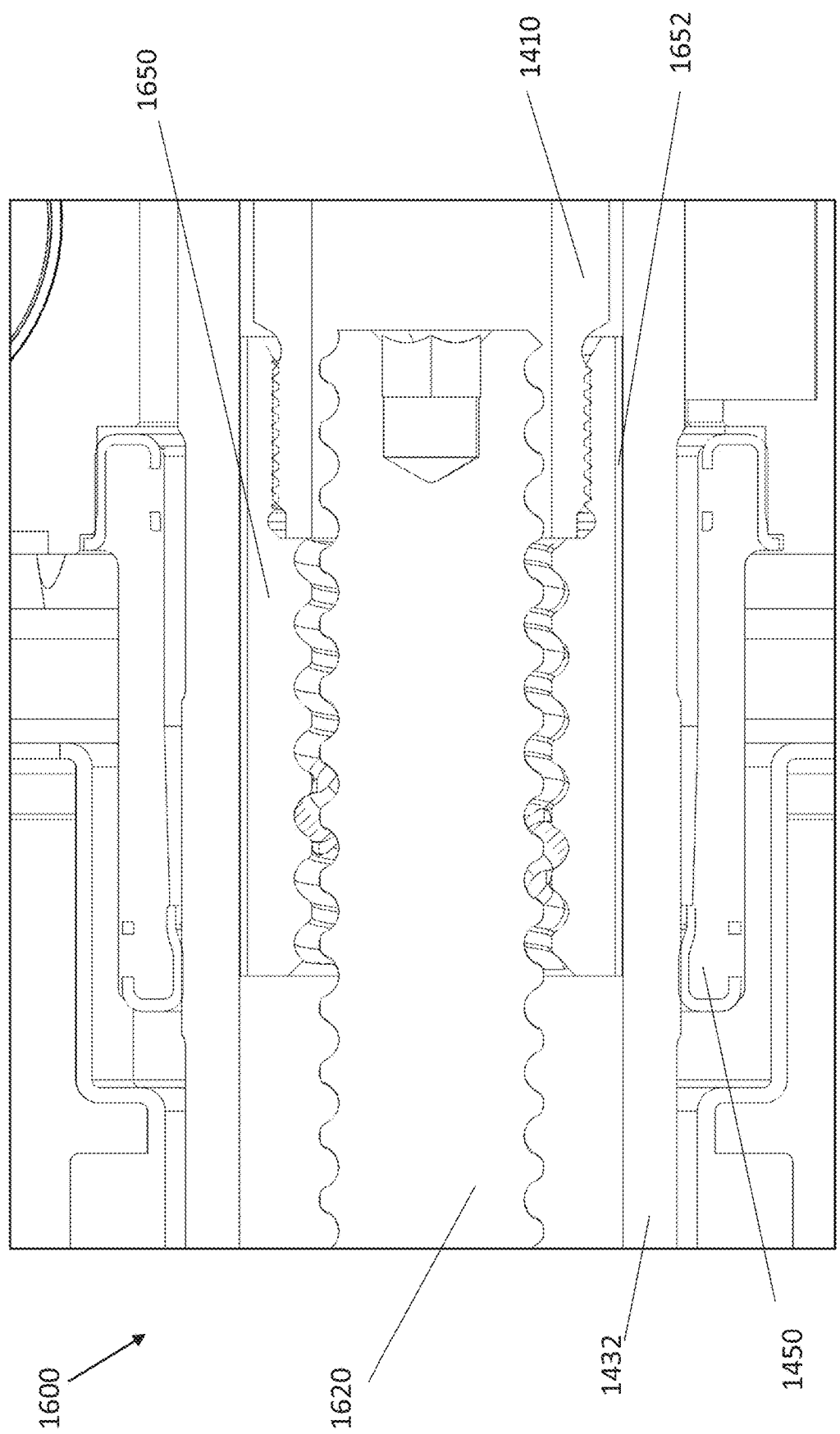
FIG. 14 is an enlarged, cross sectional view of a ball screw assembly of FIG. 9.
Figure 15:
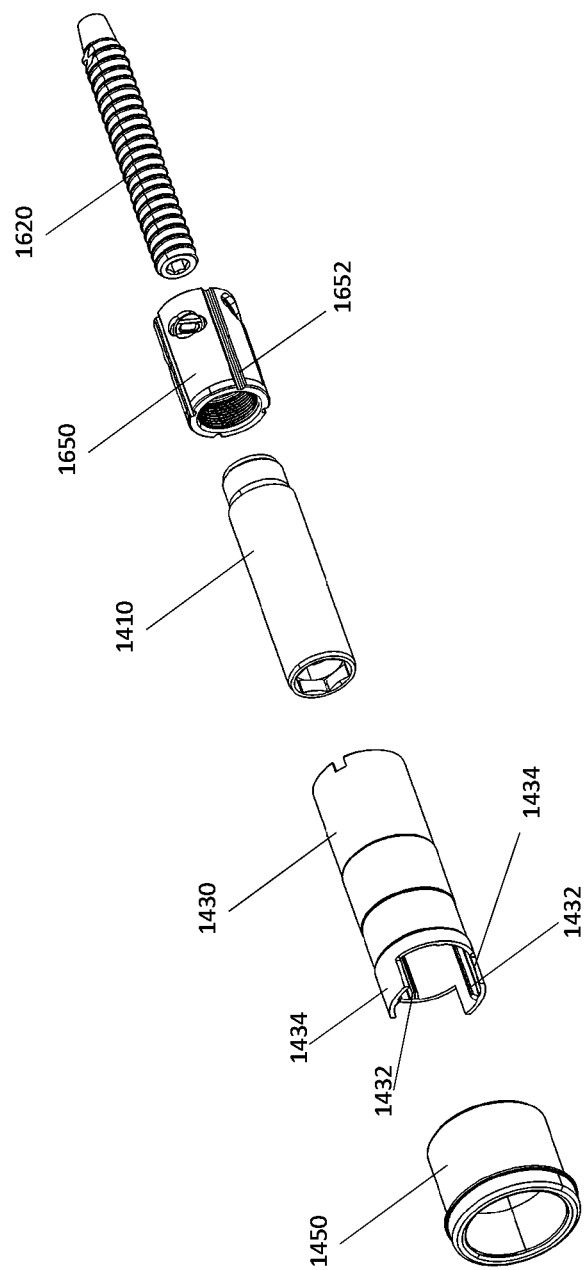
FIG. 15 is an exploded, perspective view of a ball screw assembly and support structure.

As shown in FIG. 14, the ball nut assembly 1600 further includes a ball nut 1650 with ball bearings that engage the ball screw 1620 in a manner known to those skilled in the art. For example, complementary grooves are formed on the inner surface of the ball nut 1650 bore which correspond to groove on the ball screw 1620. The ball bearings are located between the nut grooves and ball screw grooves, and as such engage both the screw 1620 and the ball nut 1650 and transfer torque there between. As best shown in FIG. 15, one end the ball nut 1650 includes a threaded end for receiving a portion of the plunger assembly 1400. Further, the outer circumferential surface of the ball nut 1650 can include one or grooves 1652 that correspond to one or more splines 1432 on an anti-rotation tube 1430.

As shown in FIG. 15, the illustrated plunger assembly 1400 is connected to the ball nut assembly 1600 by a rod 1410 with a threaded portion that is threaded into the threaded end of the ball nut 1650. In operation of the braking system 1500, rotational movement of the motor assembly 1700 is transferred to the ball screw 1620. The anti-rotation tube 1430 is provided between the housing 1502 and the ball nut 1650 to prevent rotational movement of the ball nut 1650 as a result of the rotational forces being transferred by the ball screw 1620. As shown in FIGS. 14 and 15, the one or more splines 1432 on anti-rotation tube 1430 will engage the grooves 1652 on the ball nut 1650 to minimize relative rotation between the ball nut 1650 and portions of the plunger assembly connected to the housing to ensure the transfer of rotary to linear motion of the ball screw assembly. When the splines 1432 are inserted into the slots 2152, rotation of the ball screw 1620 causes the ball nut 1650 to translate axially along the ball screw 1620. In the illustrated embodiment, the anti-rotation tube 1430 defines the full length of travel of the ball nut 1650 and supports the ball nut 1650 over the full length of travel. As such, the anti-rotation tube 1430 provides substantial support the ball nut 1650 during actuation of the motor assembly 1700, allowing the braking system to be sufficiently radially supported with the use of only one bearing, such as bearing 1720. In one embodiment, bearing 1720 may be a four-point ball bearing. Alternatively, bearing 1720 may be a barrel or roller thrust bearing.

Figure 17:
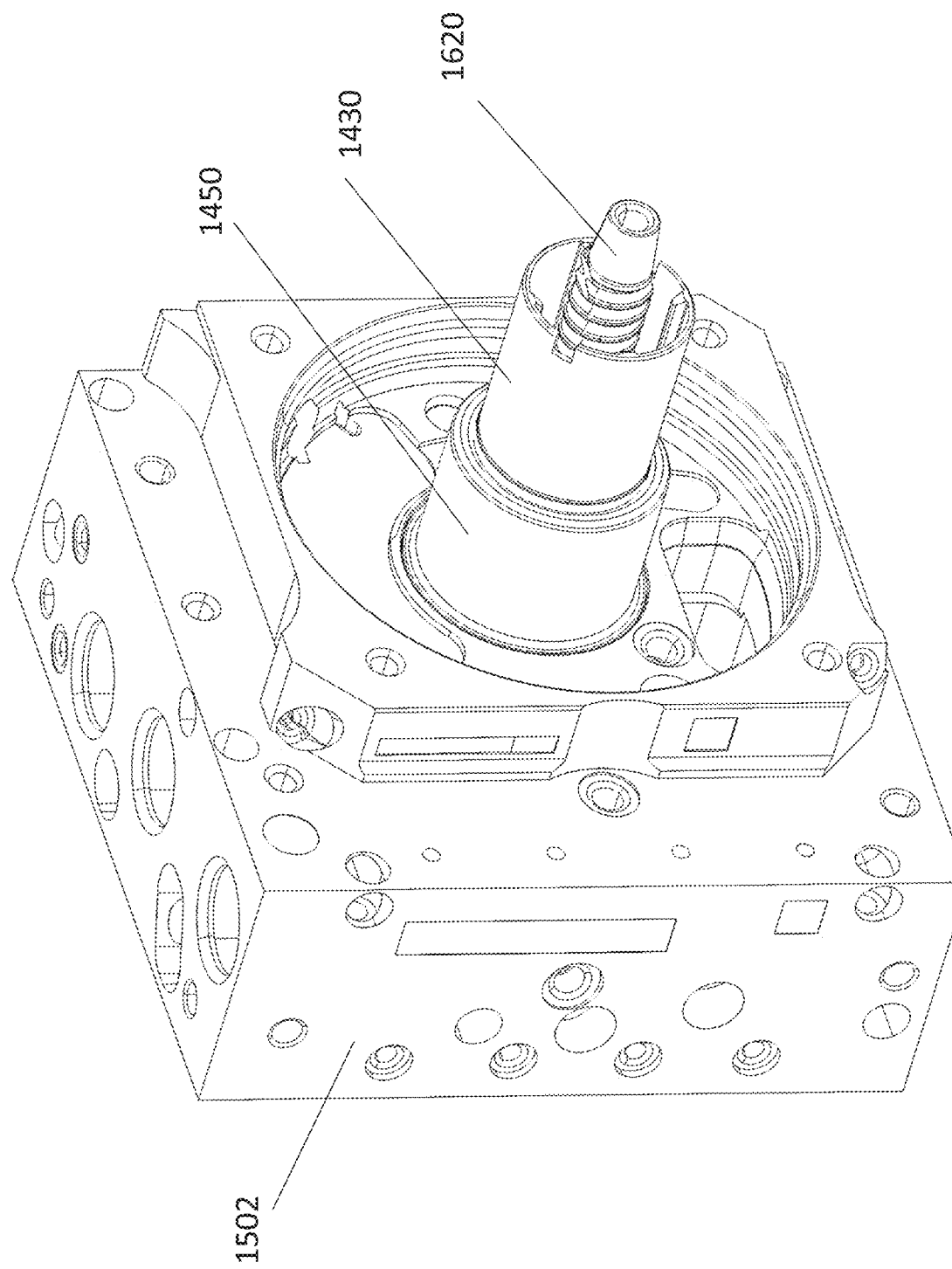
FIG. 17 is an assembled view of the ball screw and support structure assembly and the plunger housing of FIG. 16.
Figure 22:
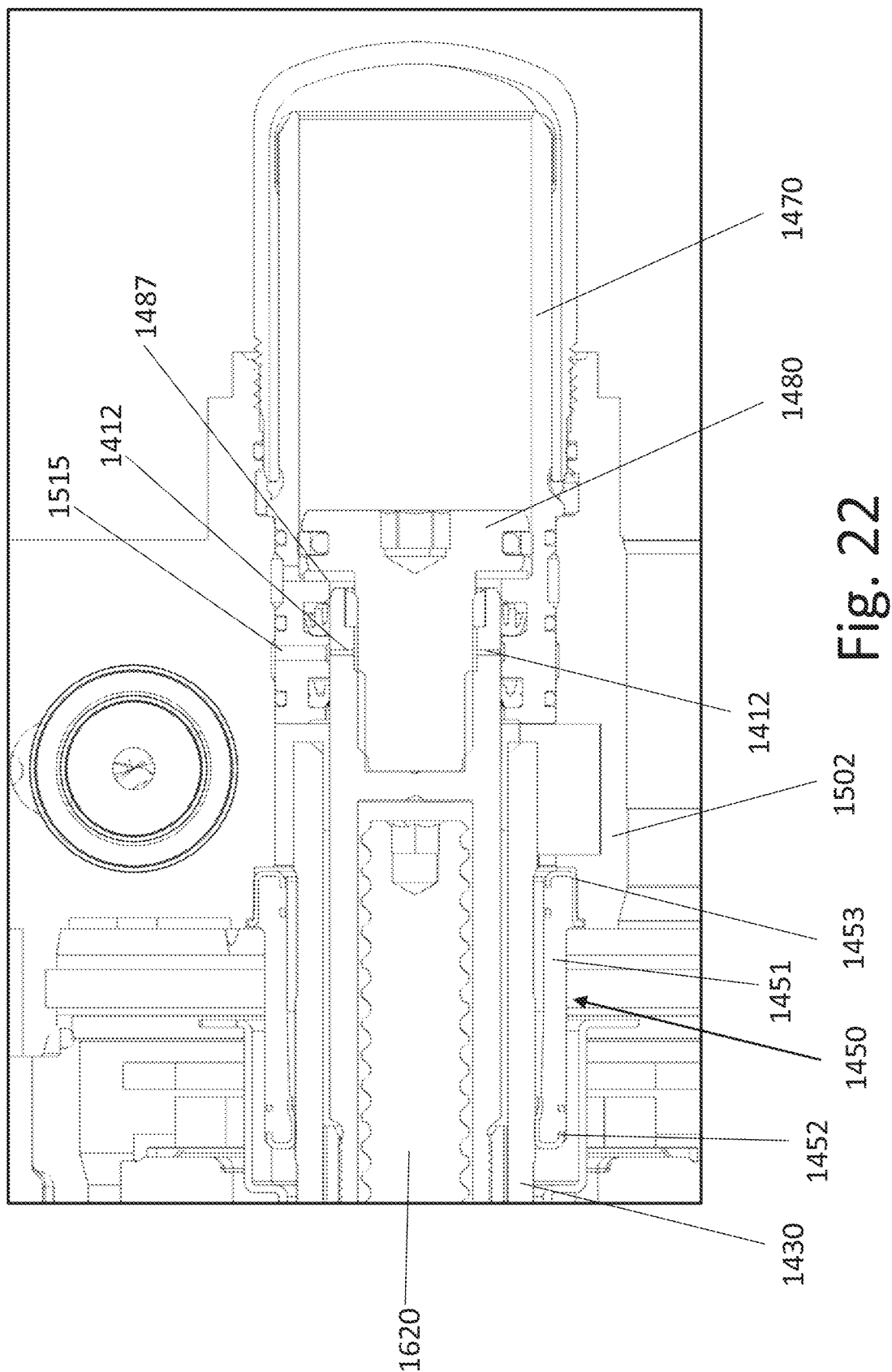
FIG. 22 is an enlarged, cross sectional view of the anti-rotation tube, plunger cylinder sleeve, and end cap sub assembly of FIG. 21.
Figure 23:
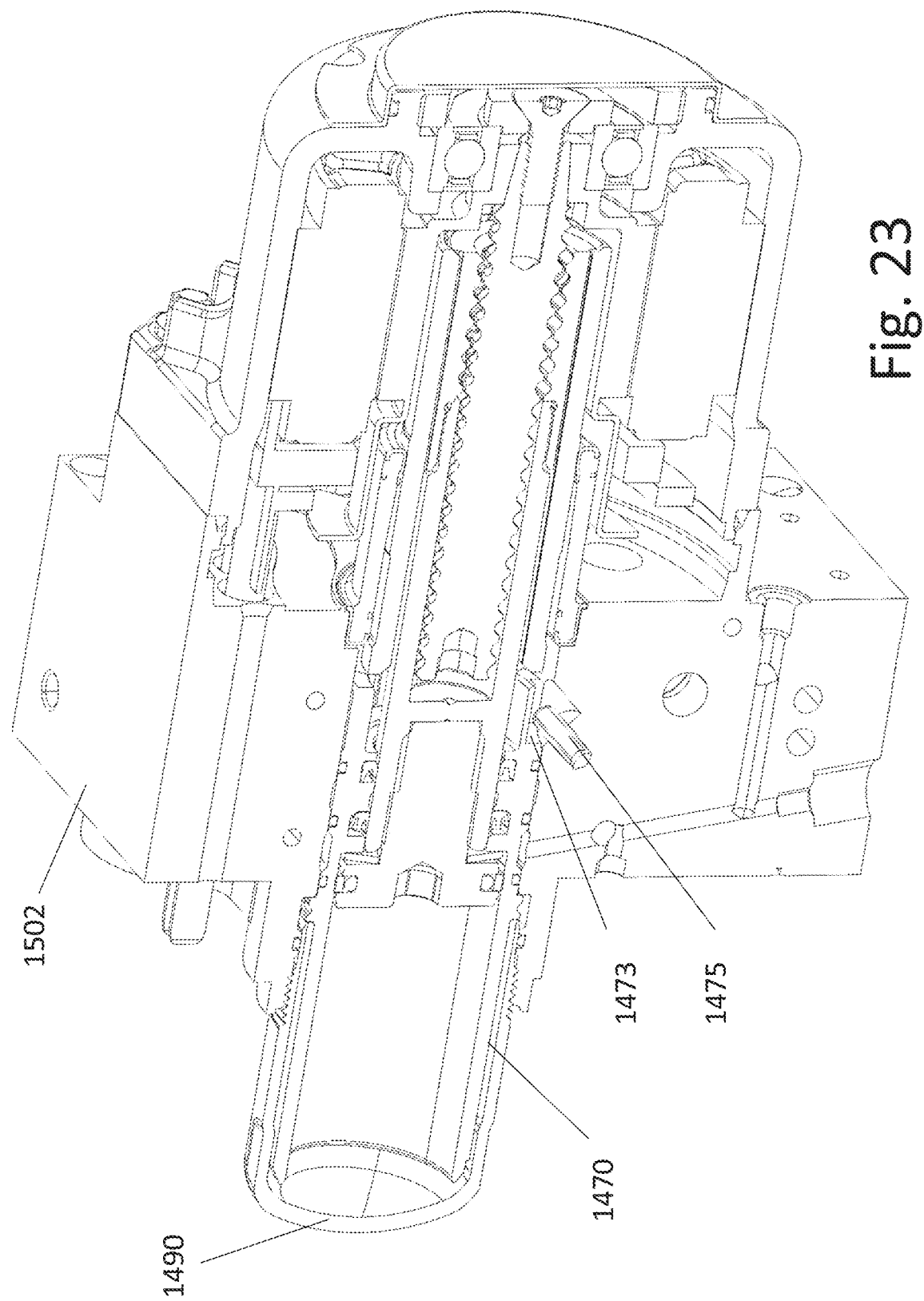
FIG. 23 is a perspective view, in cross section, of the plunger assembly of FIG. 6.

As shown in FIG. 16 and FIG. 17, the anti-rotation tube 1430 is supported on the housing 1502 by a torque coupler 1450. In the illustrated embodiment, the torque coupler 1450 is press fit or otherwise fixed into the housing 1502 and onto the outer surface of the anti-rotation tube 1430. Frictional engagement between the torque coupler 1450, the housing 1502, and the anti-rotation tube 1430 is sufficient to prevent rotational slipping between the components. As shown in FIG. 22, the torque coupler 1450 includes a center elastomer sleeve 1451 having metal rings 1452 and 1453 crimped to its ends. The ring 1452 is press fit onto the anti-rotation tube 1430, and the ring 1453 is press fit in the housing 1502. Additional fasteners or fastening mechanisms can also be utilized in the aforementioned friction connections without deviating from the scope of the invention. For example, the surface of the anti-rotation tube 1430 can be knurled to increase the frictional engagement with the torque coupler 1450. The torque coupler 1450 is formed from a material with elastic properties such that the torque coupler 1450 can deflect torsionally about the axis of rotation of the ball screw 1620. In one embodiment, the torque coupler material may be a synthetic rubber and, in particular, may be an EPDM rubber material. In addition, the torque coupler 1450 accommodates torsional movement, and thus provides torsional isolation, of the anti-rotation tube 1430 relative to the housing 1502 in both the clockwise and counter-clockwise directions. The elastic deflection of the torque coupler 1450 in the rotational direction provides isolation and damping of torsional load spikes when the motor assembly 1700 begins rotation from a stopped position or reverses the direction of rotation, as the moment of inertia of the braking system 1500 components will result in higher torsional strains on the system. During such situations, the elastic deflection of the torque coupler 1450 will absorb spikes in shear strain, while also deflecting back to its normal operating position after the initial acceleration of the of the motor assembly 1700. In a similar regard, the torque coupler 1450 can absorb shock forces that move the anti-rotation tube 1430 out of axial alignment with the ball nut 1650, but then return the anti-rotation tube 1430 to the correct position due to the elastic properties of the torque coupler 1450.

Figure 18:
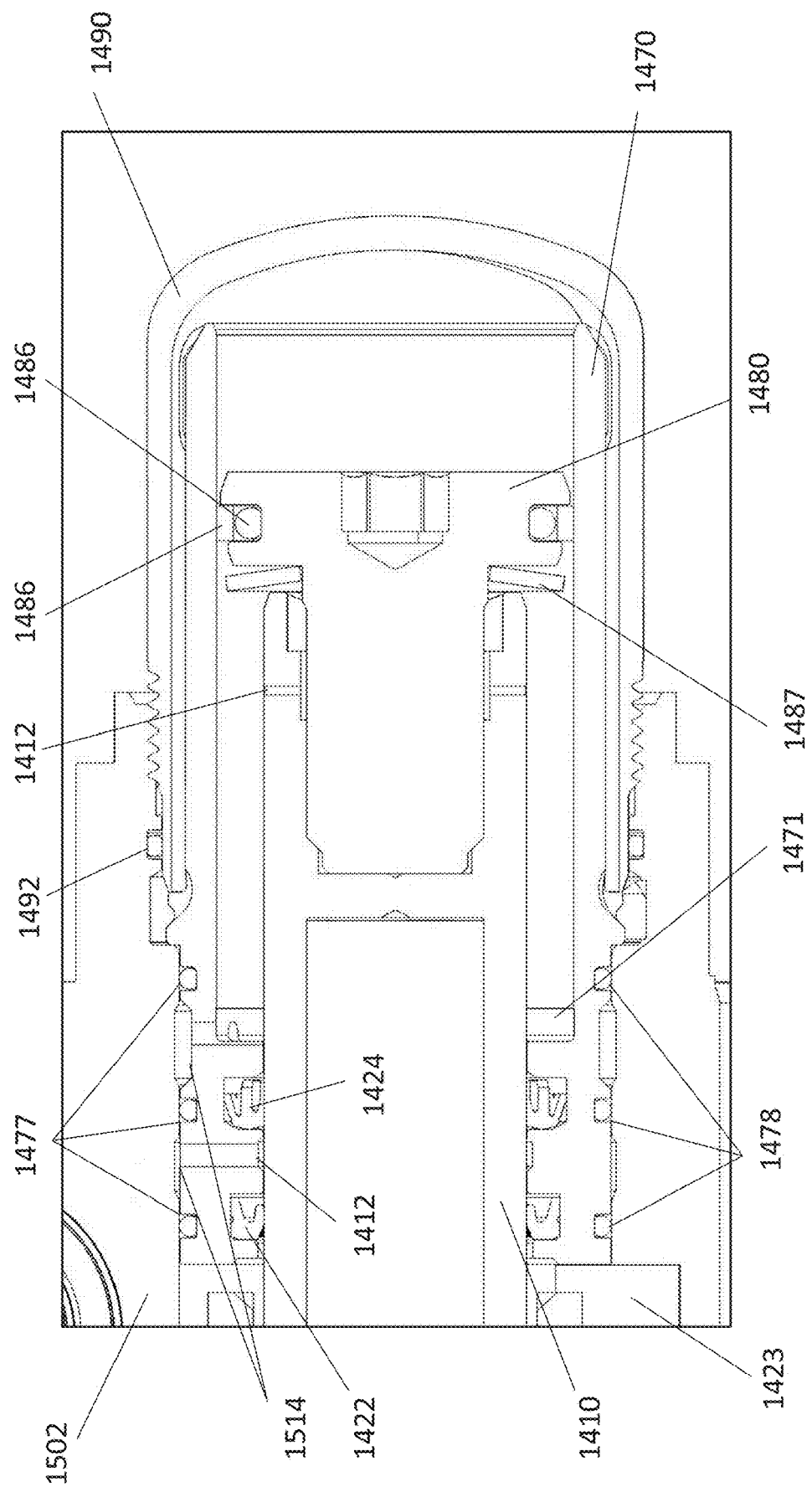
FIG. 18 is an enlarged view, in cross section, of a plunger head and cylinder.
Figure 19:
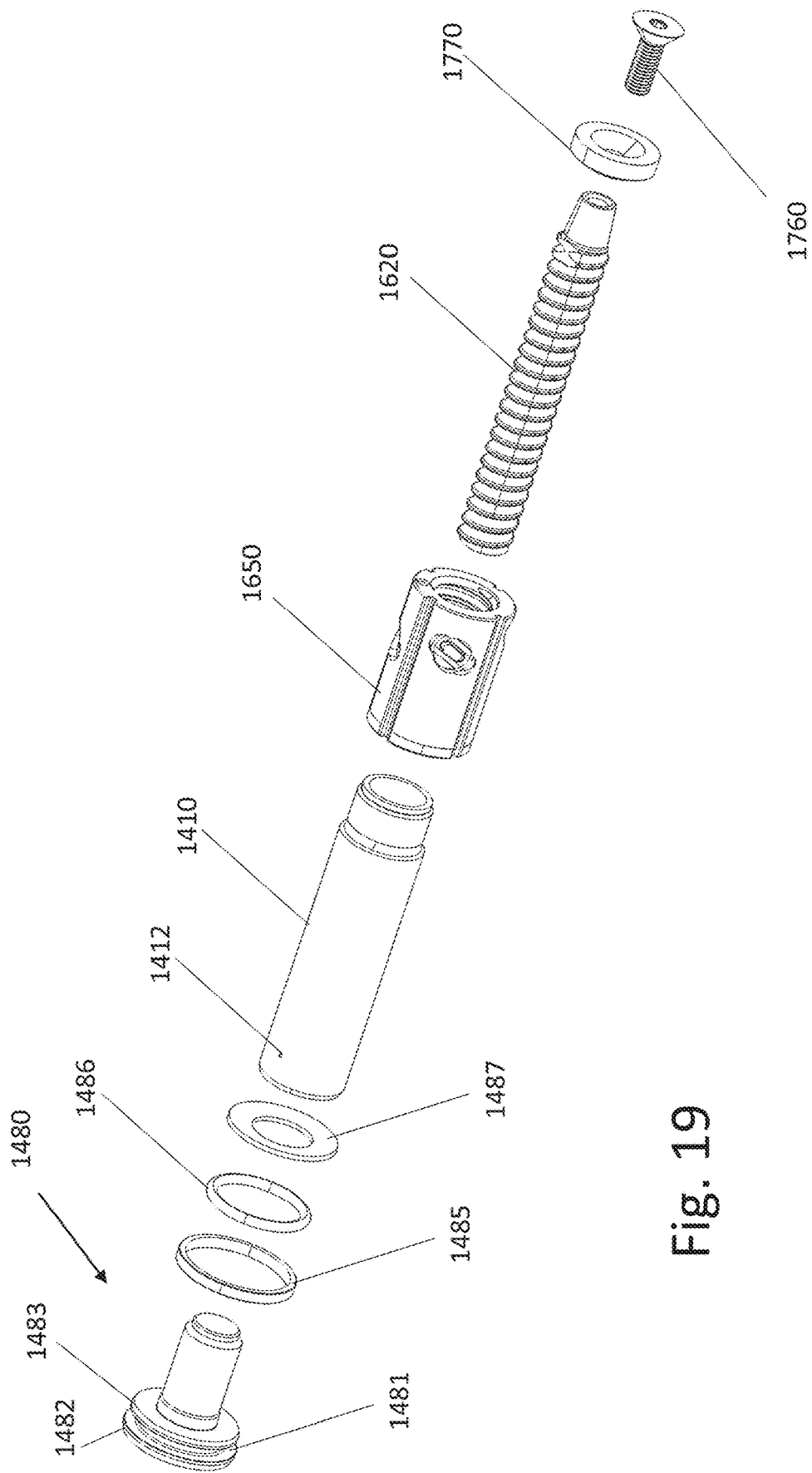
FIG. 19 is an exploded view of a plunger head and ball screw assembly.

The rod 1410 is further provided with a threaded bore at one end that corresponds with a threaded end on a plunger head 1480 as shown in FIG. 18 and FIG. 19. While the illustrated embodiment describes a threaded connection between the plunger head 1480 and the rod 1410, it is within the scope of the invention that other fastening mechanisms can be employed without deviating from the scope of the invention. It is further within the scope of the invention that the rod 1410 and plunger head 1480 can alternately be formed as one continuous part. As illustrated in FIG. 18, the plunger head 1480 also defines a widened portion with a plunger head groove 1481 extending circumferentially around. A plunger head seal 1485, such as an energized Teflon seal 1485 shown in the illustrated embodiment, is seated within the plunger head groove 1481 and abuts the interior surface of a sleeve 1470. While described as a Teflon seal, the plunger head seal 1485 may be any material or configuration that provides a generally low coefficient of friction contact during relative motion of the plunger head 1480 relative to the bore it is received within. The illustrated embodiment further includes a plunger head O-ring 1486 between the energized Teflon seal 1485 and the bottom of the plunger head groove 1481. The plunger head O-ring 1486 acts as a resilient support member beneath the energized Teflon seal 1485, such that the energized Teflon seal 1485 is urged in a radially outward direction. The energized Teflon seal 1485 and O-ring 1486 combination acts as a resilient member that radially positions and supports plunger head 1480 within a bore in sleeve 1470. However, it is within the scope of the invention that the O-ring 1486 can be incorporated into the energized Teflon seal 1485 while providing the same positioning characteristics described above.

The implementation of the energized Teflon seal 1485 provides support to the plunger head 1480, particularly in the extended position, by acting as a bearing surface. Thus, the embodied braking system 1100 requires only one bearing 1720 located generally opposite the plunger head 1480. However, it is within in the scope of the invention that two or more bearings can be used within the plunger assembly 1400. In addition, the circumferential surfaces located on the front 1482 and back 1483 of the plunger head groove 1481 may be stepped to such that the front surface 1482 is of a greater or smaller diameter relative to the back surface 1483. The stepped design allows for controlled deformation of the energized Teflon seal 1485 while preventing extrusion of the seal in either the forward or reward direction. In addition, the energized Teflon seal 1485 can be readily installed onto the plunger head 1480 by slipping the energized Teflon seal 1485 over the small diameter surface.

The plunger assembly 1400 can further comprise a crash washer 1487, for example a spring washer, Bellville washer, or other resilient member, seated between the plunger head 1480 and the rod 1410. In an actuated position, for example the position shown in FIG. 18, the crash washer 1487 is in a non-deflected state. In the event of a brake system failure or power loss scenario during retraction of the plunger assembly 1400, the inertia of the plunger assembly 1400 may continue in the retracting direction. While the viscosity of the fluid being forced through the system can reduce or stop this inertial movement, additional measures may be needed to prevent the plunger assembly from damaging components if the plunger head contacts a hard-stop surface. Thus, the arraignment of crash washer 1487 allows it to engage a sleeve park position surface 1471 before the plunger head 1480, causing the crash washer 1487 to deflect and absorb the inertial forces, as shown in FIG. 22.

In an embodiment, the crash washer 1487 can be used to determine the park position of the plunger. For example, when the crash washer 1487 abuts a surface of the housing 1502 or a surface connected to the housing 1502, the motor assembly 1700 will experience increased current or power draw due to the spring forces of the crash washer. Various electrical, software, and or electromechanical means can be used to detect the increased current or power draw to signal the braking system that the plunger assembly 1400 is in the parked position. In FIG. 22, the plunger assembly 1400 is illustrated in a position wherein the crash washer 1487 is in a fully deflected state between the plunger head 1480 and the sleeve 1470. The position of the plunger assembly 1400 in FIG. 22 can also illustrate a park position of the plunger assembly 1400 when no pressure is applied by the braking system 1500.

Figure 20:
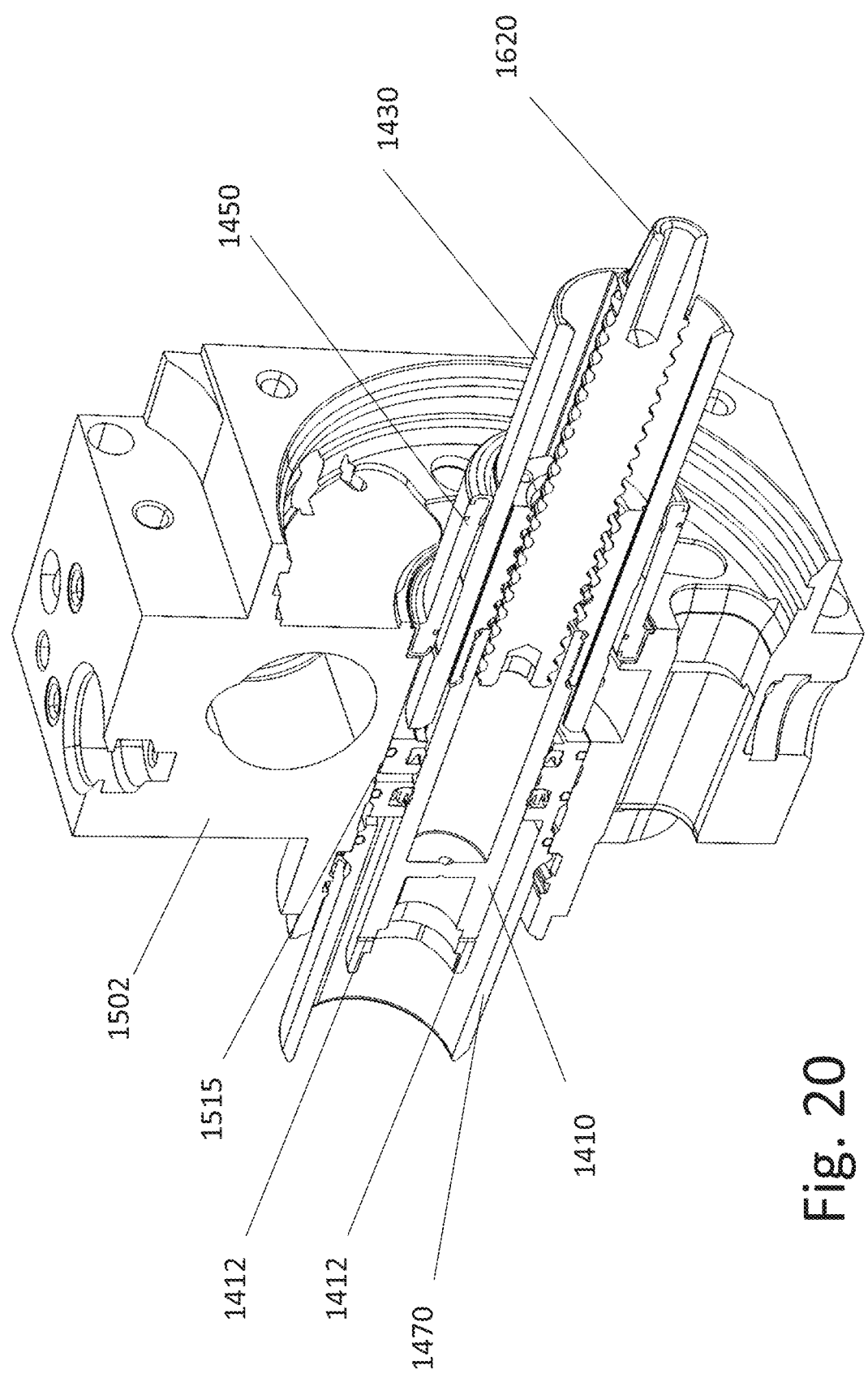
FIG. 20 is a perspective view, in cross section, of the plunger and housing assembly.

As shown in FIG. 20, the sleeve 1470 is located within the second bore 1510 of the housing 1502 but extends beyond the length of the second bore 1510. As further illustrated in FIG. 21, the one or more tabs 1472 of the sleeve form an interlocking connection with the tabs 1434 of the anti-rotation tube. The interlocking connection may accommodate various degrees of relative motion between the sleeve 1470 and the anti-rotation tube 1430, from a loose fit, where no contact is made when the torque coupler 1450 is operable, to a contacting fit that permits relative torsional movement and provides limits to the torsional deflections of the torque coupler 1450 during operation. The tolerances between the anti-rotation tube tabs 1434 and the sleeve tabs 1472 will allow for some rotational movement of the anti-rotation tube 1430, due to the elastic properties of the torque coupler 1450, without coming into contact with each other. It is also within the scope of the invention that the tolerances between the anti-rotation tube tabs 1434 and the sleeve tabs 1472 are such that rotation of the anti-rotation tube 1430 is limited by the respective tabs coming into contact with one another. In another embodiment, one set or both sets of the interconnecting tabs 1434 and 1472 may be coated with a resilient material in order to provide a secondary cushioning effect when contact of the interconnecting tabs 1434 and 1472 may occur.

In addition, a pin 1475 is secured to the housing 1502 such that one end is inserted into an aperture in the housing and the other end of the pin is disposed in a detent 1473 in at least one of the sleeve tabs 1472 or in the sleeve 1470. During assembly, the pin 1475 aligns a series of sleeve apertures 1476, shown in FIG. 21, the purpose of which is further discussed below, to the upright position. After assembly, the pin 1475 functions as a fail-safe mechanism in the event that the sleeve 1470, anti-rotation tube 1430, or torque coupler 1450 decouple from the housing 1502. In such an event, the pin 1475 would maintain the position of the sleeve 1470 relative to the housing 1502 and the interlocking connection between the anti-rotation tube tabs 1434 and the sleeve tabs 1472 will resist rotational movement of the anti-rotation tube.

Figure 21:
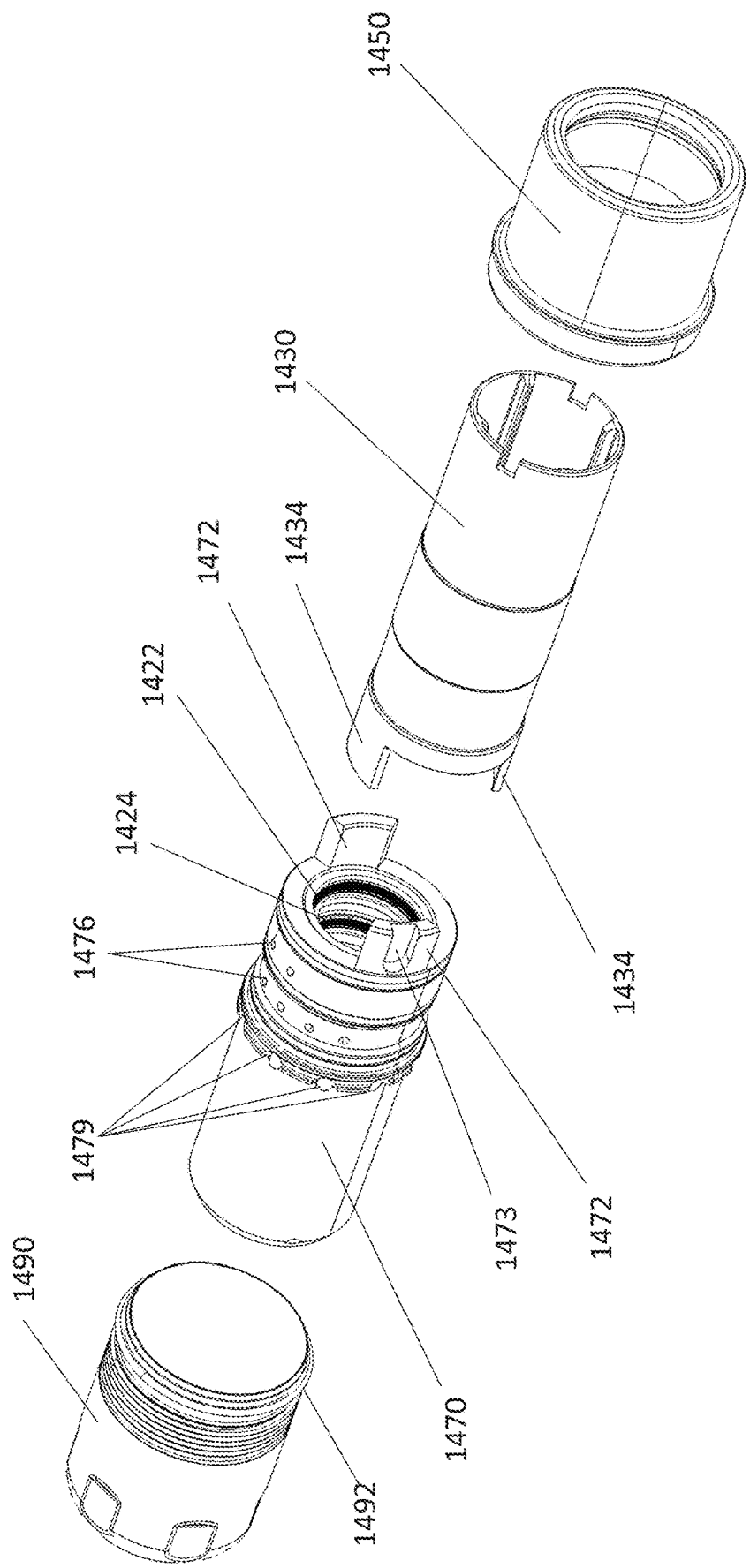
FIG. 21 is an exploded view of an anti-rotation tube, plunger cylinder sleeve, and end cap sub assembly.

As best shown in FIG. 18, grooves 1477, illustrated as three grooves though more or fewer may be used, are defined on the outer circumferential surface of the sleeve 1470, each holding seal 1478, such as an O-ring seal 1478. The sleeve 1470 is inserted into the housing 1502 such that the three or more O-ring seals 1478 engage an inner surface of the housing second bore 1510. As illustrated in FIG. 21, the sleeve can further comprise the series of apertures 1476 located between the three or more O-ring seals 1478. When the sleeve 1470 is located within the housing bore, the O-rings 1478 will establish hydraulically separated volumes 1514 as illustrated in FIG. 18. Further, the apertures located between the O-rings 1478 allow fluid to flow between an inner diameter of the sleeve 1470 and an outer diameter of the sleeve 1470. Thus, selective fluid communication can occur between a source of fluid at or near the center of the plunger assembly and a passageway extending from the housing second bore 1510 of the housing 1502 by a movable aperture or passageway, as will be described below.

As illustrated in FIG. 18, the sleeve 1470 comprises a bore with a diameter sized to correspond to the diameter of the rod 1410. The sleeve bore also defines two circumferential grooves in which an "L" shaped seal 1422 and "E" shaped seal 1424 are seated within. When the rod 1410 and plunger head 1480 are positioned in the sleeve 1470 bore, as illustrated in FIG. 19, the "L" shaped seal 1422 and "E" shaped seal 1424 abut the outer diameter of the rod 1410. The abutting connection is such that the rod 1410 and plunger head 1480 can freely move forward and backward relative to the sleeve 1470, but also establishes hydraulically separate spaces. The space located between the energized Teflon seal and the "E" shaped seal 1424 establishes the second pressure chamber. The passageway 1421 between the "E" shaped seal 1424 and the "L" shaped seal 1422 establish a flow path for fluid leaving rod flow metering cross holes 1412 in the rod 1410. The area behind the "L" shaped seal 1422 is generally intended to be free of fluid, but the illustrated embodiment further comprises a drip chamber or drip path 1423, shown in FIG. 24, for the collection of any fluid due to weepage around the "L" shaped seal 1422.

As shown in FIG. 22, the illustrated rod flow metering cross holes 1412 allow venting of the brakes to the reservoir in boost mode. In slip control, it allows the release of pressure by pulling the plunger back to vent to the reservoir without the need for dump valve actuation. In addition, the rod flow metering cross holes 1412 allow fluid to flow between the park position relief conduit 1515 and the second pressure chamber. When the plunger assembly 1400 is advanced and retracted to supply pressurized fluid to the system, differences between the actual plunger assembly position and the computed plunger assembly position can arise. Thus, it is important to reestablish the park position to prevent over extension or retraction of the plunger assembly. In reestablishing the park position, the braking system 1500 can retract the plunger assembly 1400 back towards the park position. When the correct positioning is arrived at, the rod flow metering cross holes 1412 will align with the park position relief conduit 1515. As a result, the pressure in the second chamber will decrease, which can be detected by the braking system 1500 by either fluid flow or pressure change, and the system will stop the retraction of the plunger assembly 1400 and set the current position as the park position. Another advantage of the rod flow metering cross holes 1412 aligning with the park position relief conduit 1515 arises when a boosted braking event has completed and it is desired for the wheel brakes to be unactuated. While the built up pressure in the braking system 1500 could be relieved by actuation of the dump valves.

In order to enclose the opening provided by the second bore 1510 in the housing 1502, an end cap 1490 is secured to the end cap mount 1511. In the illustrated embodiment, the end cap 1490 is a generally hollow cylindrical device with an open threaded end. When secured to the housing, a threaded end of the end cap 1490 engages the end cap mount 1511. Further, an end cap seal 1492 can be placed between the end cap 1490 and the housing 1502 to prevent the ingress of contaminants and egress of fluid. As shown in FIGS. 18 and 22, the inner bore diameter of the end cap 1490 is greater than the outer diameter of the sleeve 1470. In operation, fluid is allowed to pass between the sleeve 1470 and the end cap 1490, such that the end cap 1490 acts as a pressure barrel chamber for the braking system. Thus, the co-axial positioning of the end cap 1490 and the sleeve 1470 cooperates to create a fluid pathway to the first pressure chamber without the need for additional conduits or passageways.

Figure 24:
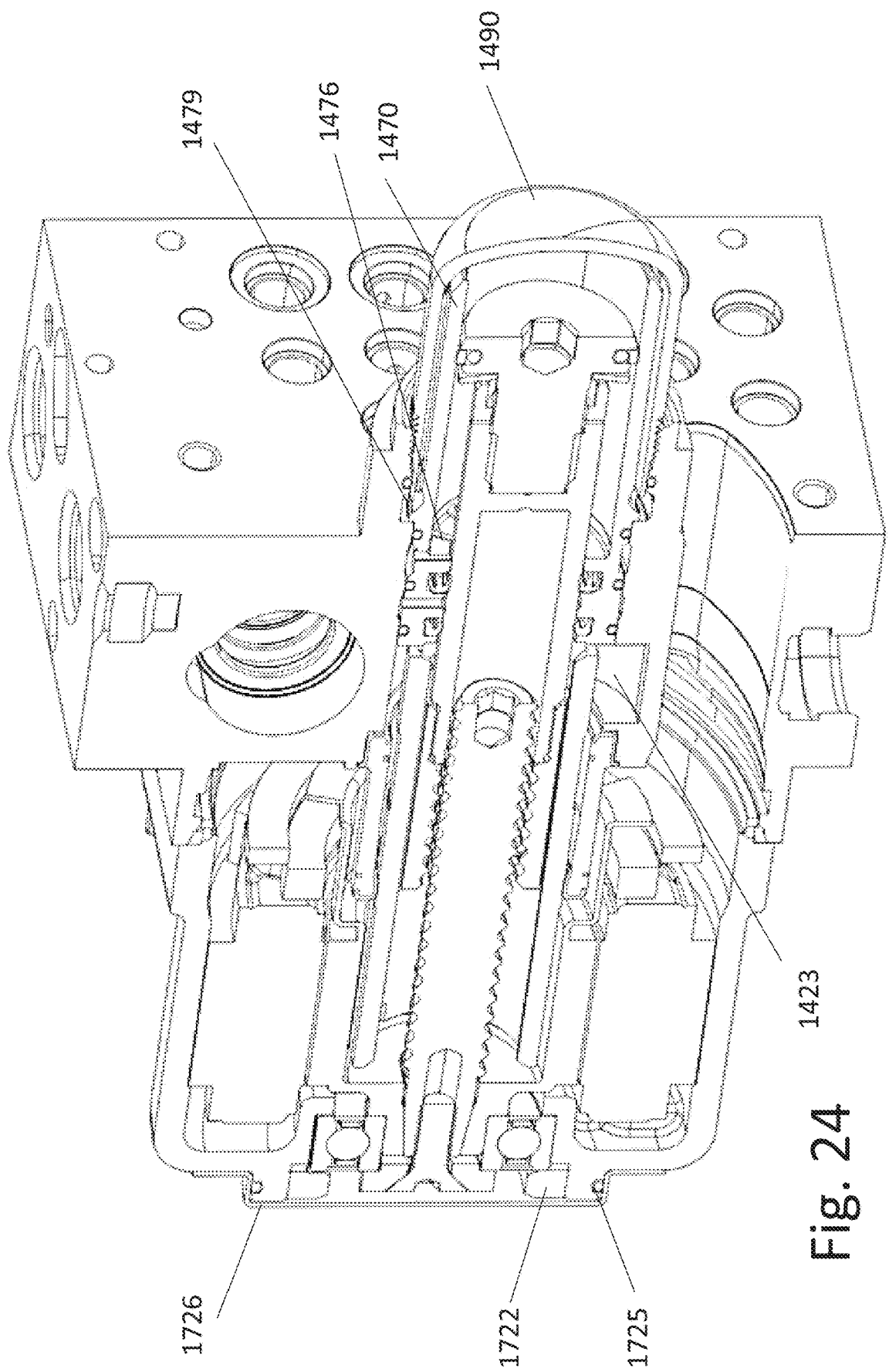
FIG. 24 is a perspective view, in cross section, of the plunger assembly of FIG. 5.

As shown in FIG. 24, flow slots 1479 in the sleeve 1470 allow fluid to flow from the first pressure chamber to a conduit or from a conduit to the first pressure chamber. In the illustrated embodiment, the flow slots 1479 are evenly spaced about the circumference of sleeve 1470 to improve flow in the first pressure chamber. However, it is also within the scope of invention that the flow slots 1479 can be located on only a portion of the sleeve 1470. For example, locating the flow slots 1479 or a single larger opening at the top of the sleeve 1470 would aid in the bleeding the braking system 1500 of fluid during a maintenance procedure.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A plunger assembly for an integrated vehicle brake system, the plunger assembly operable as a pressure source to control brake fluid pressure supplied to one or more wheel brakes, the plunger assembly comprising:
 a housing block and an end cap affixed to the housing block to define a cylinder;
 a reversible motor and a plurality of valves supported within the housing block;

a linear actuator disposed within the housing block and driven by the reversible motor;

a plunger disposed within the cylinder and driven by the linear actuator in first and second opposite directions, the plunger cooperating with the cylinder and the end cap to define a first chamber containing a brake fluid received from a fluid reservoir, wherein the first chamber is hydraulically connected to the wheel brakes via a first port, and wherein a fluid pressure in the first chamber is increased when the plunger is moved in the first direction and is decreased when the plunger is moved in the second direction, wherein the cylinder and the end cap project from one side of a housing block so that the first chamber receiving brake fluid projects out of the housing block, and the end cap is secured to the housing block in a generally coaxial relationship with the cylinder, and wherein at least one fluid passageway defined in the housing block is configured to fluidly couple the first chamber to the wheel brakes via the first port.

2. The plunger assembly recited in claim 1, further comprising a sleeve extending into the end cap and the housing radially between the housing and the plunger.

3. The plunger assembly recited in claim 2, wherein fluid flows in a radial gap between the sleeve and the end cap.

4. The plunger assembly recited in claim 2, wherein the sleeve includes flow slots providing fluid communication between the first chamber and the at least one fluid passageway.

5. The plunger assembly recited in claim 2, wherein the plunger moves in the first and second directions relative to the sleeve.

\* \* \* \* \*